(12) United States Patent
Kinoshita

(10) Patent No.: US 8,035,709 B2
(45) Date of Patent: Oct. 11, 2011

(54) IMAGE PICKUP APPARATUS PROVIDED WITH A SOLID-STATE IMAGE PICKUP DEVICE

(75) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 12/268,634

(22) Filed: Nov. 11, 2008

(65) Prior Publication Data

US 2009/0122165 A1 May 14, 2009

(30) Foreign Application Priority Data

Nov. 13, 2007 (JP) ................ P2007-293875

(51) Int. Cl.
H04N 3/14 (2006.01)
H04N 5/335 (2006.01)
H04N 9/04 (2006.01)
H04N 9/64 (2006.01)
G06K 9/00 (2006.01)

(52) U.S. Cl. ......... 348/272; 348/248; 348/280; 382/167
(58) Field of Classification Search .................. 348/248, 348/252, 255, 272, 280
See application file for complete search history.

(56) References Cited

U.S. PATENT DOCUMENTS

| | | | | |
|---|---|---|---|---|
| 5,053,615 A | * | 10/1991 | Patel | 250/208.1 |
| 6,944,337 B2 | * | 9/2005 | Jaspers | 382/167 |
| 7,113,213 B2 | | 9/2006 | Matsunaga et al. | |
| 7,561,194 B1 | * | 7/2009 | Luo | 348/241 |
| 7,656,441 B2 | * | 2/2010 | Palum et al. | 348/241 |
| 7,728,887 B2 | * | 6/2010 | Ueda | 348/248 |
| 7,800,663 B2 | * | 9/2010 | Nakamura | 348/248 |
| 7,830,428 B2 | * | 11/2010 | Jerdev et al. | 348/273 |
| 7,864,232 B2 | * | 1/2011 | Kinoshita et al. | 348/272 |
| 2005/0117039 A1 | | 6/2005 | Tatani | |
| 2006/0001751 A1 | | 1/2006 | Abe et al. | |
| 2006/0043440 A1 | | 3/2006 | Hiyama et al. | |

(Continued)

FOREIGN PATENT DOCUMENTS

EP 2061231 A2 * 5/2009

(Continued)

OTHER PUBLICATIONS

Hirakawa, Keigo; "Cross-Talk Explained"; Oct. 12-15, 2008; 15th IEEE International Conference on Image Processing.*

*Primary Examiner* — John Villecco
(74) *Attorney, Agent, or Firm* — Finnegan, Henderson, Farabow, Garrett & Dunner, L.L.P.

(57) ABSTRACT

An image pickup apparatus includes a solid-state image pickup device sharing a circuit necessary for a pixel structure between multiple pixels composing each set including a certain number of pixels having the same arrangement pattern; a pixel mixture correcting unit correcting leakage of light that should be incident on each pixel of the solid-state image pickup device from the pixel into adjacent pixels and/or leakage of light that should be incident on the adjacent pixels into the pixel in accordance with a correction parameter; a correction parameter generating unit generating multiple correction parameters corresponding to the multiple pixels composing the set; and a correction parameter selecting unit selecting the correction parameter from the multiple correction parameters in accordance with which pixel in the multiple pixels composing the set a pixel to be corrected corresponds to and supplying the selected correction parameter to the pixel mixture correcting unit.

6 Claims, 17 Drawing Sheets

U.S. PATENT DOCUMENTS

| | | | |
|---|---|---|---|
| 2006/0098868 A1* | 5/2006 | Fainstain et al. | 382/167 |
| 2007/0146511 A1 | 6/2007 | Kinoshita et al. | |
| 2007/0165116 A1* | 7/2007 | Hung et al. | 348/241 |

FOREIGN PATENT DOCUMENTS

| | | | |
|---|---|---|---|
| JP | 10271519 A * | 10/1998 | |
| JP | 11146409 A * | 5/1999 | |
| JP | 11146410 A * | 5/1999 | |
| JP | 2004-172950 | 6/2004 | |
| JP | 2005-110104 | 4/2005 | |
| JP | 2006003880 A * | 1/2006 | |
| JP | 2006-73733 | 3/2006 | |
| JP | 2006121164 A * | 5/2006 | |
| JP | 2006-157953 | 6/2006 | |
| JP | 3838665 | 8/2006 | |
| JP | 2007-142697 | 6/2007 | |

* cited by examiner

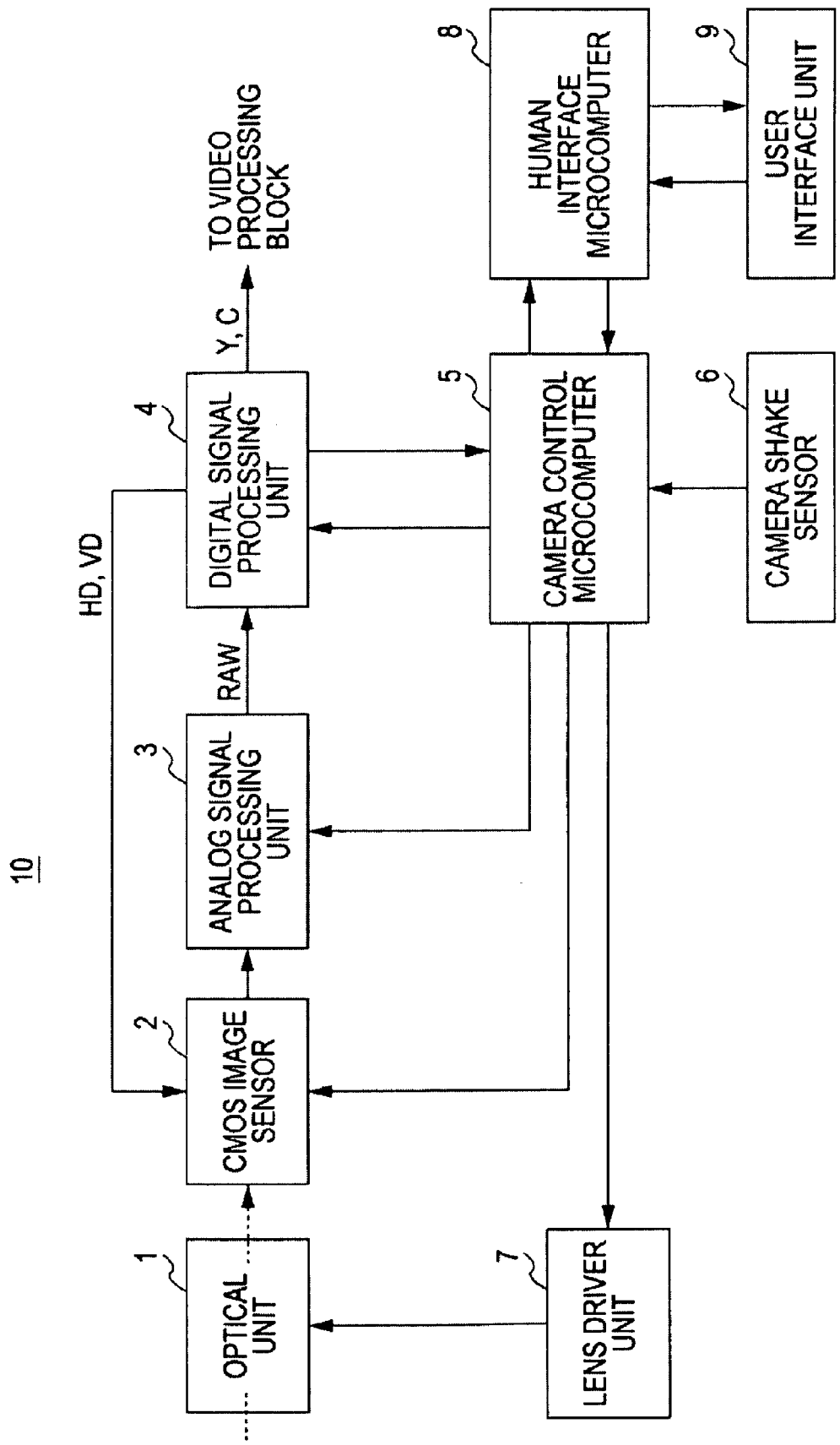

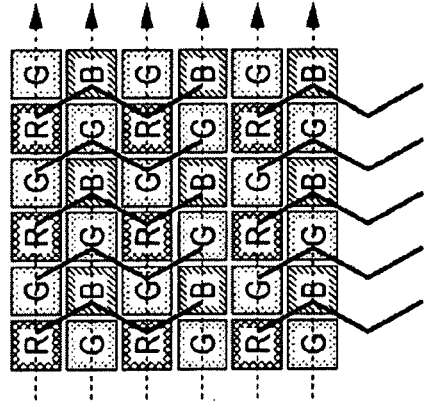
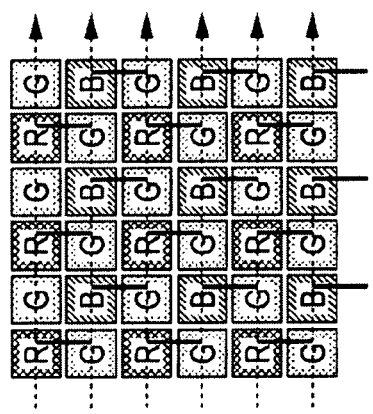
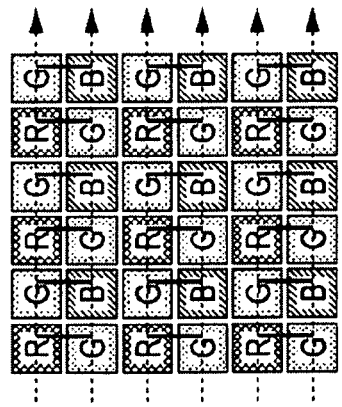

CORRECTION PARAMETER
(COLOR MIXTURE RATE)

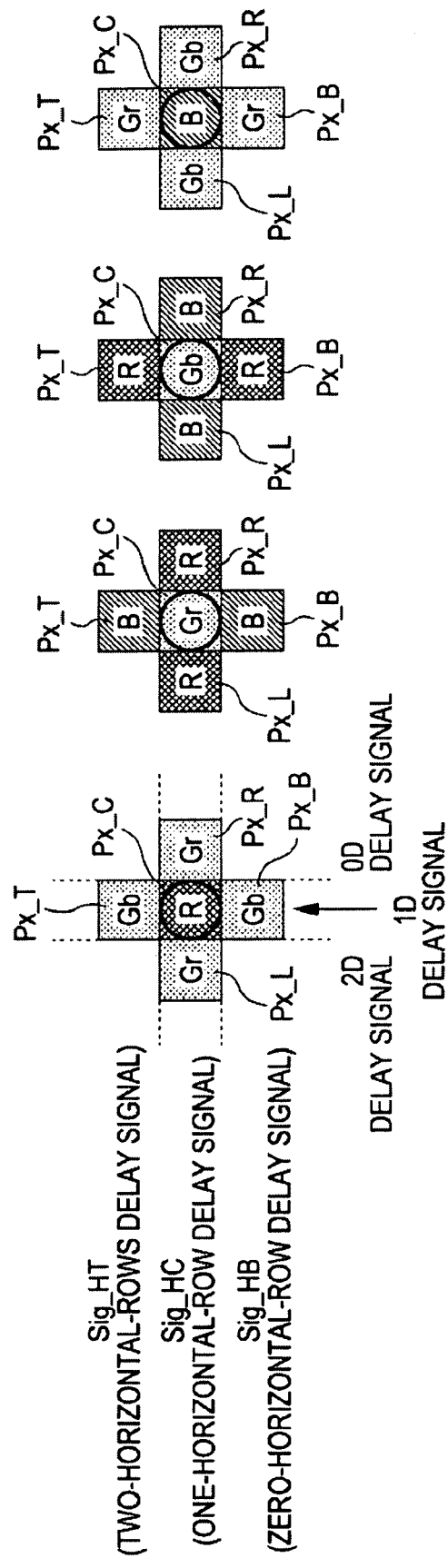

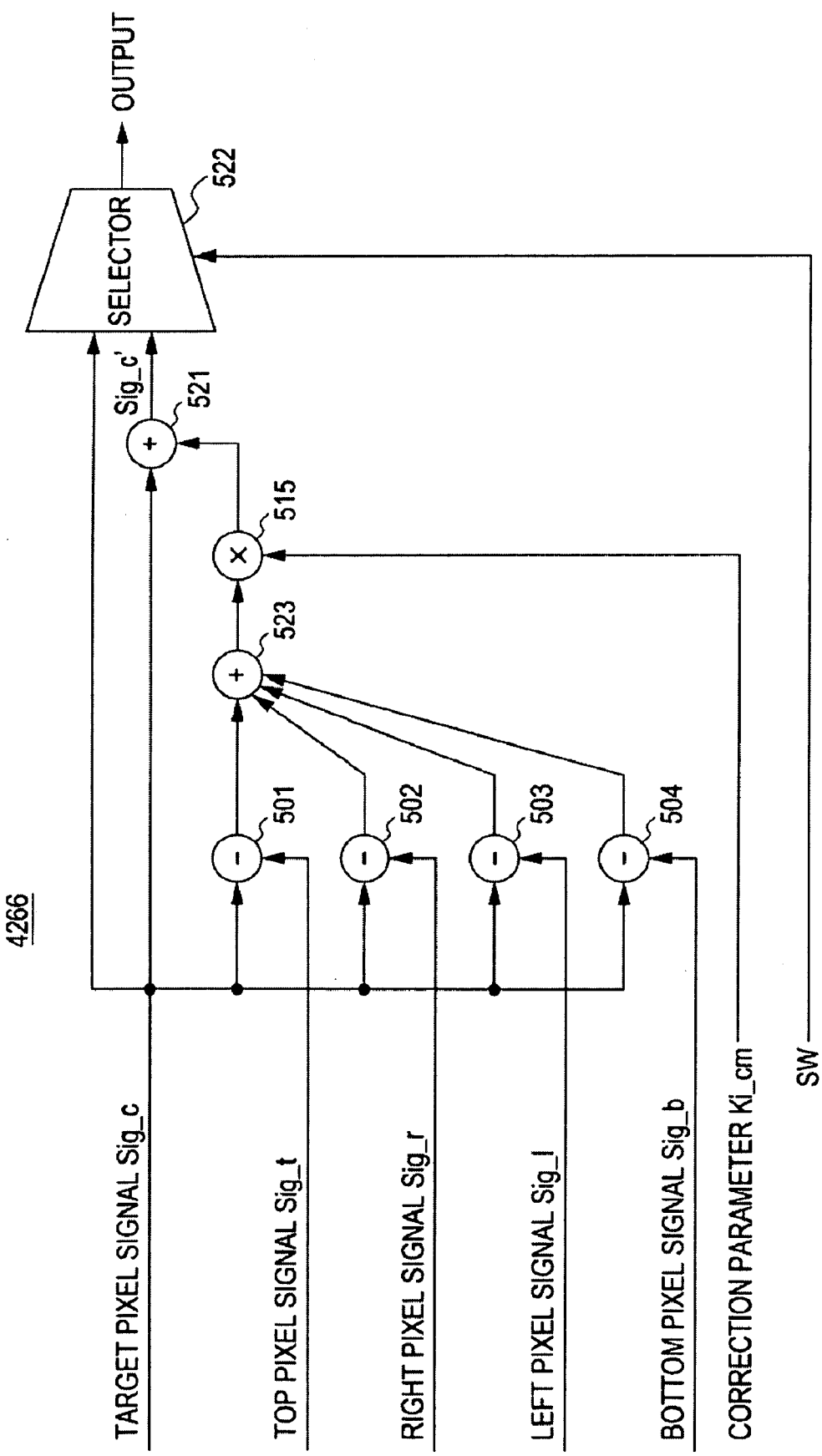

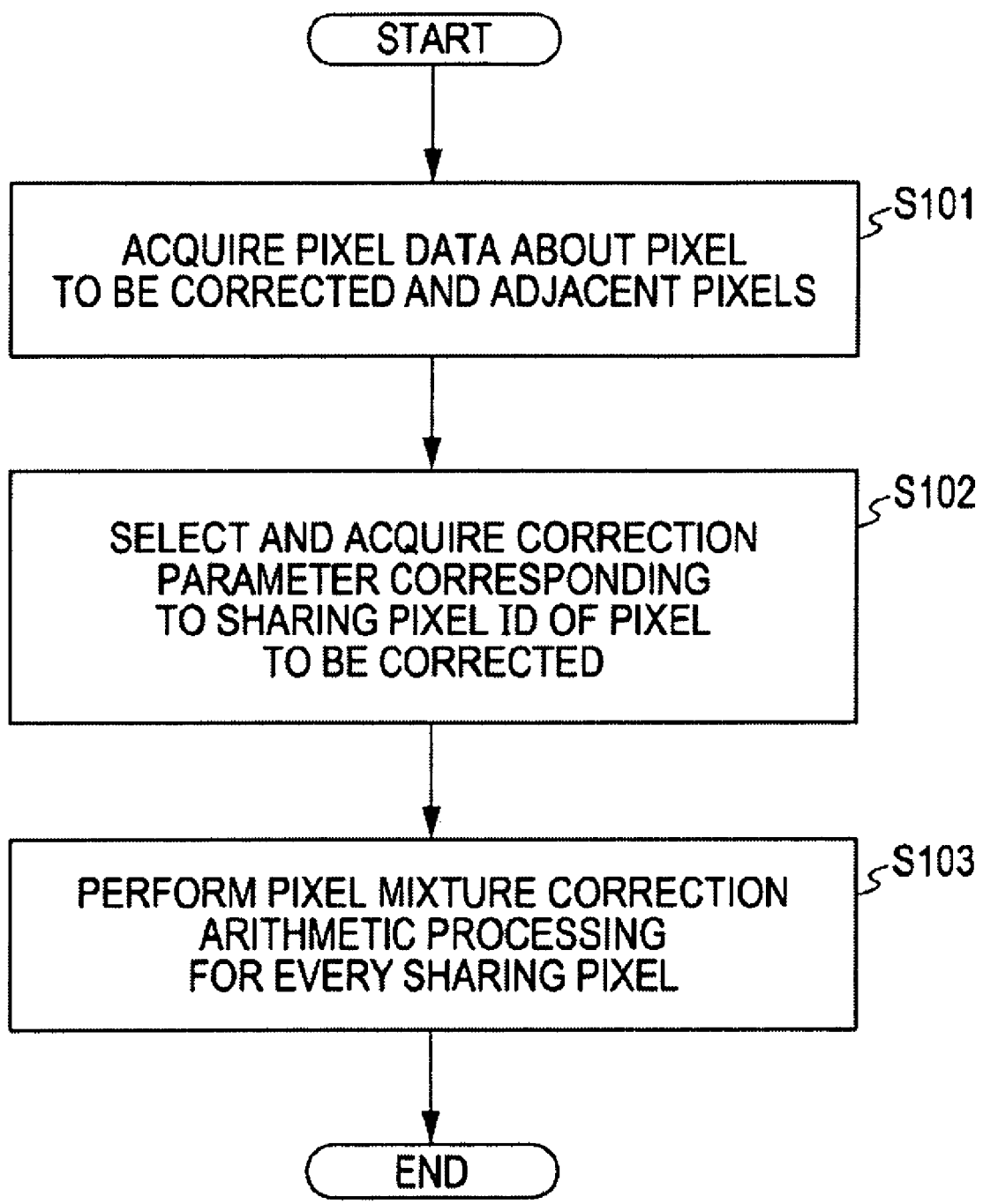

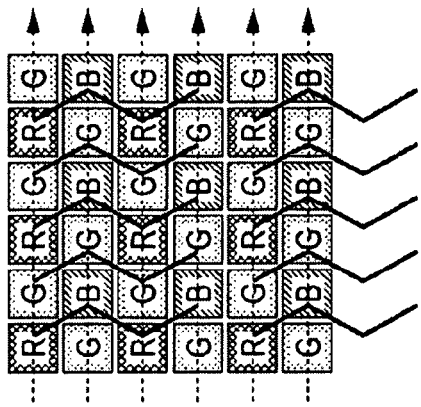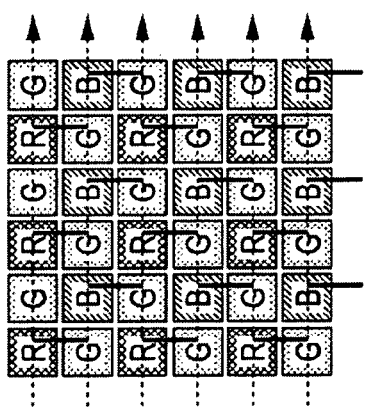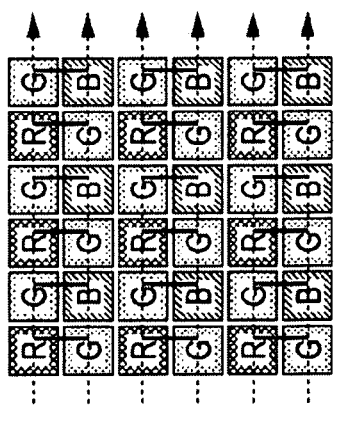

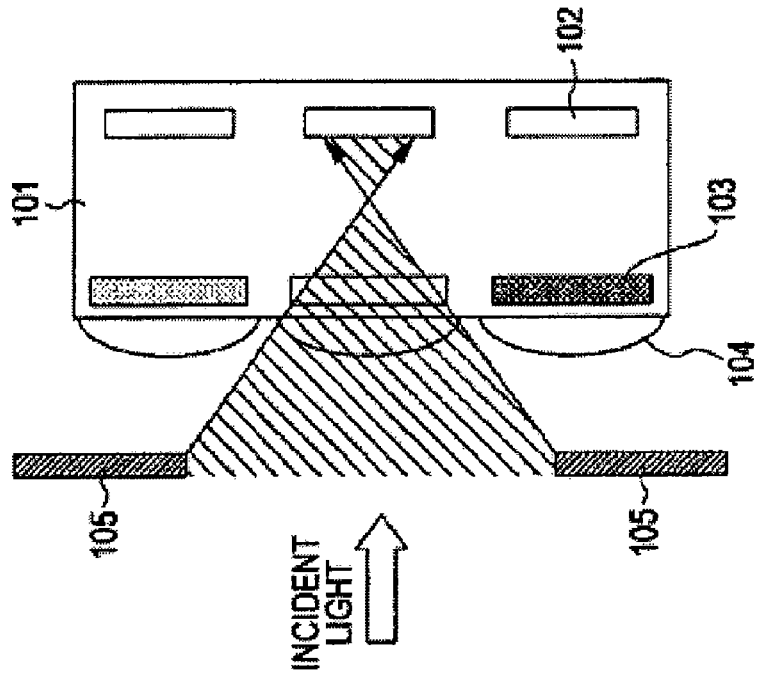
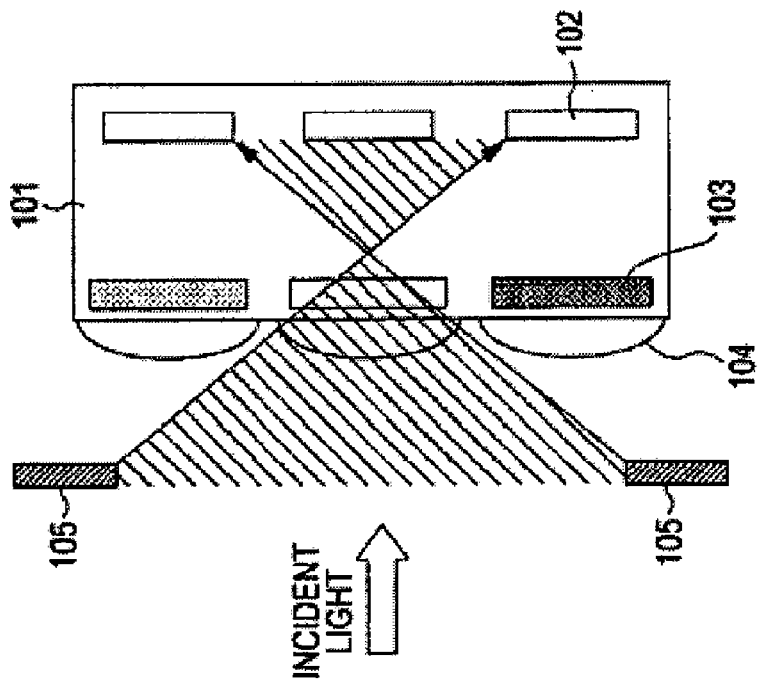

IMAGE PICKUP APPARATUS PROVIDED WITH A SOLID-STATE IMAGE PICKUP DEVICE

CROSS REFERENCES TO RELATED APPLICATIONS

The present invention contains subject matter related to Japanese Patent Application JP 2007-293875 filed in the Japanese Patent Office on Nov. 13, 2007, the entire contents of which are incorporated herein by reference.

BACKGROUND OF THE INVENTION

1. Field of the Invention

The present invention relates to an image pickup apparatus provided with a solid-state image pickup device, such as a complementary metal oxide semiconductor (CMOS) image sensor, a method of correcting image data captured by the image pickup apparatus, and a program executing the method.

2. Description of the Related Art

Solid-state image pickup devices, such as charge coupled devices (CCD) image sensors and CMOS image sensors, are configured such that microlenses for condensing light are layered on color filters under which pixel cells including photoelectric transducers are provided.

A problem called "pixel mixture" is unable to be disregarded in such an image pickup device as the pixels are increasingly reduced in size with the increasing density of the pixels in recent years. The pixel mixture is caused because the pitch of the pixels is decreased and light that is condensed by the microlenses on the image pickup devices and that passes through the color filters not only is incident on a pixel on which the light is to be condensed but also tends to leak into adjacent pixels.

FIGS. 18A and 18B illustrate how the pixel mixture occurs. In the examples shown in FIGS. 18A and 18B, the image pickup device is a CMOS image sensor 101 in which condenser lenses 104 composed of microlenses are layered on color filters 103 under which pixel cells 102 are provided. An aperture 105 is provided above the image sensor 101.

When the aperture 105 is not sufficiently narrow as in the example shown in FIG. 18A, light incident on the image sensor 101 through the opening of the aperture 105 is incident on not only one target pixel cell 102 but also adjacent pixel cells 102. Accordingly, the light passing through the color filters 103 other than the color filter 103 for the own pixel cell 102 is incident on each pixel cell 102. From the viewpoint of one pixel, part of the light that should be incident on the pixel leaks from the pixel into pixels around the pixel and part of the light that should be incident on the pixels around the pixel leaks into the pixel. Such a phenomenon is called the pixel mixture.

In contrast, when the aperture 105 is sufficiently narrow and the light incident in the image sensor 101 is incident on only one pixel cell 102 as in the example shown in FIG. 18B, the pixel mixture does not occur.

Since an occurrence of the pixel mixture degrades the separation between the adjacent pixels, an output image is reduced in resolution. In addition, in the case of a single-plate image pickup apparatus (camera system) having one solid-state image pickup device, since light passing through the color filters of different colors leaks into the pixels, the color of an image can become lighter and/or a geometrical pattern depending on the amount of color mixture can be produced in an even area of the image (an area where the content of the image is not varied or is slightly varied). In general, these problems suddenly cause adverse effects on the quality of output images as the pitch of the pixels is made narrower.

The leakage of light from a pixel into adjacent pixels around the pixel and the leakage of light from the adjacent pixels into the pixel are called the pixel mixture in this specification not only when the color of the color filter for the own pixel cell is different from the colors of the color filters for the adjacent pixel cells but also when the colors of the color filters for the adjacent pixel cells are the same as the color of the color filter for the own pixel cell.

Accordingly, in addition to the case where the color filters of different colors are layered on the pixel cells as in the single-plate color image pickup apparatus, also when the color filters for each image pickup device have the same color as in a three-plate color image pickup apparatus having one solid-state image pickup device for the color filter of each color, the state in which light incident on the image pickup apparatus is incident on not only one pixel cell but also adjacent pixel cells is called the pixel mixture.

In the above case, the pixel mixture can cause the resolution to be reduced and the pixels that should have the same color and brightness can be varied in contrast.

Technologies for correcting the pixel mixture in order to resolve the above problems include a technology disclosed in Japanese Unexamined Patent Application Publication No. 2007-142697. In a basic process of the correction technology disclosed in Japanese Unexamined Patent Application Publication No. 2007-142697, a value given by multiplying the difference between the value of a target pixel to be corrected, supplied from the solid-state image pickup device in an image pickup apparatus, and the value of an adjacent pixel by an appropriate correction factor (correction parameter) is added to the value of the target pixel. Provision of directionality (the difference in the direction and position between the target pixel and the adjacent pixel) to the correction factor and control by using an F-number are described in Japanese Unexamined Patent Application Publication No. 2007-142697.

In recent years, there is an increasing need for solid-state image pickup devices, such as the CCD image sensors and the CMOS image sensors, used in video cameras and digital still cameras to increase the number of pixels and to reduce in size. The increase in the number of pixels with the reduction in size causes the area of each pixel to be decreased, thus possibly lowering the pixel sensitivity.

In order to resolve such a problem, the proportion of photodiodes in the pixel structures of the solid-state image pickup devices has been increased as much as possible by devising the circuitry and the wiring layout and/or developing the manufacturing process to achieve both the increase in the number of pixels and the reduction in size. Each pixel structure is composed of the photodiode and a peripheral circuit including amplifier transistors and reset transistors.

However, the recent demand for the solid-state image pickup devices to increase the number of the pixels and to reduce in size is increasing and an improvement in the image quality at lower illumination also attracts attention. Accordingly, it may not be possible to provide the solid-state image pickup devices capable of achieving the pixel sensitivity that ensures a desirable image quality only by the above actions.

In such a situation, pixel sharing technologies receive widespread attention in order to overcome the above drawbacks of the solid-state image pickup devices. In the pixel sharing technologies, part of the circuit necessary for the pixel structure, for example, the amplifier transistors and/or the reset transistors, are shared between multiple pixels that are horizontally and/or vertically adjacent or close to each other to reduce the area of the circuit (including the wiring) per pixel and to increase the area of the photodiode by the amount corresponding to the reduction in the area of the circuit per pixel, thereby improving the pixel sensitivity.

For example, Japanese Patent Application No. 3838665 discloses a pixel sharing technology for sharing the amplifier transistors and the reset transistors necessary to read out pixel data from each pixel between two adjacent pixels. In this technology, the pixel data is read out from each pixel while the two adjacent pixels connected to the amplifier transistors and the reset transistors are sequentially selected at slightly different times to decrease the number of transistors per pixel and to increase the area of the photodiode by the amount corresponding to the decrease in the number of transistors per pixel in order to realize the improvement of the pixel sensitivity.

All the pixels are normally structured evenly in general solid-state image pickup devices that do not adopt the pixel sharing technology. In other words, the pixel structure of the general solid-state image pickup devices is common to the pixels at any positions on the screen. Accordingly, the photodiodes for all the pixels have the same peripheral environment in the semiconductor structure in such general solid-state image pickup devices. Consequently, the optical characteristics are basically common to all the pixels if the factor of any variation in the manufacturing is excluded.

In contrast, in a typical solid-state image pickup device adopting the "pixel sharing technology" disclosed in, for example, Japanese Patent Application No. 3838665, all the units have the same structure when the multiple pixels that share the circuit and that are adjacent or close to each other are considered as one unit while the pixels arranged at different positions in each unit have different peripheral environments in the semiconductor structure. Accordingly, the arrangement pattern of the multiple pixels sharing the circuit is repeated to produce the circuit layout in the solid-state image pickup device adopting the pixel sharing technology.

Specifically, when the multiple pixels sharing the circuit are considered as one unit, the multiple units are repetitively arranged horizontally and vertically in the solid-state image pickup devices adopting the pixel sharing technology. Since the photodiodes for the pixels arranged at the same position in the arrangement pattern of the multiple pixels in the multiple units have the same peripheral environment in the semiconductor structure, the pixels have the same optical characteristics.

However, the pixels arranged at different positions in the arrangement pattern of the multiple pixels sharing the circuit in the multiple units, that is, the pixels that are adjacent or close to each other in each of the multiple units have different circuitries and/or layouts. Accordingly, the photodiodes for the pixels have different peripheral environments in the semiconductor structure, thus providing different pixel characteristics.

Consequently, even if an image of a fully even subject is captured by the solid-state image pickup device adopting the "pixel sharing technology", different pixel values are output from adjacent pixels in each unit and, thus, there is a problem in that the quality of the final output image may be greatly lowered.

In related art, in order to resolve the above problems involved in the pixel sharing, many technologies for devising the pixel structure of the solid-state image pickup device are disclosed in, for example, Japanese Unexamined Patent Application Publication No. 2004-172950, Japanese Unexamined Patent Application Publication No. 2005-110104, Japanese Unexamined Patent Application Publication No. 2006-73733, and Japanese Unexamined Patent Application Publication No. 2006-157953. In such technologies, for example, (A) the pixel layout is devised to reduce the optical unevenness as much as possible or (B) the pixel sharing is performed so as not to adversely affect the output images if the optical unevenness occurs.

SUMMARY OF THE INVENTION

The technology for correcting the "pixel mixture" disclosed in Japanese Unexamined Patent Application Publication No. 2007-142697 is based on the assumption that the characteristics of the pixel mixture are common to all the pixels across the screen (all the pixels across the screen have the same characteristics of the pixel mixture).

Accordingly, it is necessary to eliminate the variation in the pixel characteristics between sharing pixels also in the solid-state image pickup apparatus adopting the pixel sharing technology by using any of the technologies disclosed in Japanese Patent Application No. 3838665, Japanese Unexamined Patent Application Publication No. 2004-172950, Japanese Unexamined Patent Application Publication No. 2005-110104, Japanese Unexamined Patent Application Publication No. 2006-73733, and Japanese Unexamined Patent Application Publication No. 2006-157953.

However, as described above, the pixel structure of the solid-state image pickup device is devised in the technologies disclosed in Japanese Unexamined Patent Application Publication No. 2004-172950, Japanese Unexamined Patent Application Publication No. 2005-110104, Japanese Unexamined Patent Application Publication No. 2006-73733, and Japanese Unexamined Patent Application Publication No. 2006-157953. Accordingly, with the devise of the pixel structure by the method (A), it is possible to reduce the optical unevenness between the multiple pixels sharing a circuit (the multiple pixels sharing a circuit are hereinafter referred to as "sharing pixels") but it is not possible to eliminate the optical unevenness thereof. consequently, it is not possible to completely correct the pixel mixture or some pixels can be subjected inverse correction in the solid-state image pickup apparatus adopting the pixel sharing technology in the related art even with the technologies for correcting the "pixel mixture" described above because the sharing pixels are varied in the pixel characteristics. As a result, there is a problem of adverse effects on the quality of output images.

There is also a problem in that severe restrictions can be imposed on the pixel structure, the layout, or the readout structure of pixel data of the solid-state image pickup device in both of the methods A and B for reducing the variation in the pixel characteristics between the sharing pixels. Furthermore, severe restriction can be imposed on the entire image pickup apparatuses processing the outputs from the solid-state image pickup devices to which the method (A) or (B) is applied.

In order to resolve the above problems, it is desirable to provide an image pickup apparatus capable of further reducing the effect of the pixel mixture on the quality of output images also in the solid-state image pickup device adopting the pixel sharing technology.

According to an embodiment of the present invention, an image pickup apparatus includes a solid-state image pickup device configured to share a circuit necessary for a pixel structure between multiple pixels composing each set, the multiple pixels being arranged in a two-dimensional array, the set including a certain number of pixels having the same arrangement pattern; pixel mixture correcting means for correcting leakage of light that should be incident on each pixel of the solid-state image pickup device from the pixel into adjacent pixels around the pixel and/or leakage of light that should be incident on the adjacent pixels into the pixel in accordance with a correction parameter; correction parameter generating means for generating multiple correction parameters corresponding to the multiple pixels composing the set; and correction parameter selecting means for selecting the correction parameter from the multiple correction parameters supplied from the correction parameter generating means in accordance with which pixel in the multiple pixels composing the set a pixel to be corrected by the pixel mixture correcting means corresponds to and supplying the selected correction parameter to the pixel mixture correcting means.

The correction parameter generating means generates the multiple correction parameters corresponding to the multiple pixels composing the set, that is, corresponding to the sharing pixels. The correction parameter selecting means selects the correction parameter corresponding to the pixel to be corrected from the multiple correction parameters supplied from the correction parameter generating means in accordance with which sharing pixel the pixel to be corrected by the pixel mixture correcting means corresponds to and supplies the selected correction parameter to the pixel mixture correcting means.

Accordingly, the pixel mixture correcting means performs the pixel mixture correction by using the correction parameter set for every sharing pixel, thus further reducing the effect of the pixel mixture on the quality of output images also in the solid-state image pickup device to which the pixel sharing technology is applied.

According to the present invention, it is possible to further reduce the effect of the pixel mixture on the quality of output images also in the solid-state image pickup device to which the pixel sharing technology is applied without devising the pixel structure of the solid-state image pickup device.

BRIEF DESCRIPTION OF THE DRAWINGS

FIG. 1 is a block diagram showing an example of the configuration of an image pickup apparatus according to a first embodiment of the present invention;

FIGS. 4A to 4C are diagrams for description of arrangement patters of sharing pixels and sharing pixel IDs in the solid-state image pickup device used in the image pickup apparatus according to the first embodiment of the present invention;

FIGS. 7A to 7D are diagrams for description of the image pickup apparatus according to the first embodiment of the present invention;

FIG. 15 is a block diagram showing an example of the configuration of a processor in the image pickup apparatus according to the second embodiment of the present invention;

FIG. 16 is a flowchart for description of a unit in an image pickup apparatus according to another embodiment of the present invention;

FIGS. 17A to 17C are diagrams for description of arrangement patters of sharing pixels in the image pickup apparatus according to another embodiment of the present invention; and FIGS. 18A and 18B are diagrams for description of pixel mixture in a solid-state image pickup device.

DESCRIPTION OF THE PREFERRED EMBODIMENTS

Figure 2C:
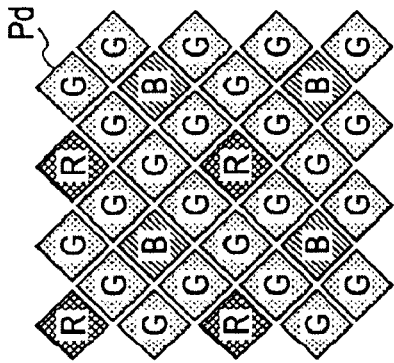
FIGS. 2A to 2E illustrate exemplary pixel arrays and exemplary arrangements of color filters in a solid-state image pickup device used in the image pickup apparatus according to the first embodiment of the present invention.

Embodiments of an image pickup apparatus according to the present invention will herein be described in detail with reference to the attached drawings.

First Embodiment

FIG. 1 is a block diagram showing an example of the configuration of the main components in an image pickup apparatus 10 according to a first embodiment of the present invention. The image pickup apparatus 10 includes an optical unit 1 including a lens, a CMOS image sensor 2, which is a solid-state image pickup device, an analog signal processing unit 3, a digital signal processing unit 4, a camera control microcomputer 5, a camera shake sensor 6, a lens driver unit 7, a human interface microcomputer 8, and a user interface unit 9.

The optical unit 1 is provided with an actuator that adjusts the position of the lens in order to correct camera shaking. The actuator is driven and controlled by a lens drive signal supplied from the lens driver unit 7.

The CMOS image sensor 2 has many pixels horizontally and vertically arranged thereon. The pixel sharing technology is applied to the CMOS image sensor 2. The CMOS image sensor 2 also has color filters arranged at the side on which light is incident in order to generate color images.

Figure 2B:
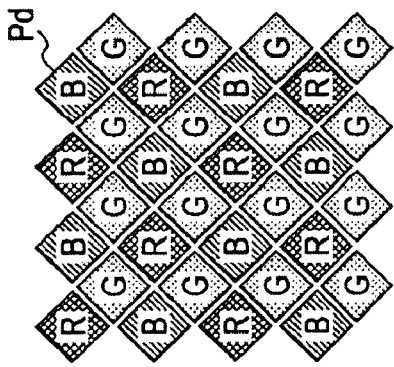
Figure 2E:
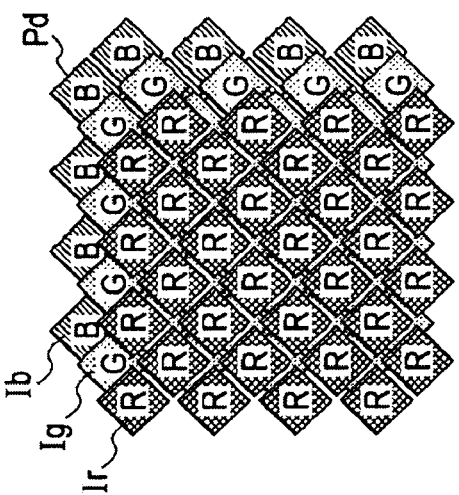
Figure 2A:
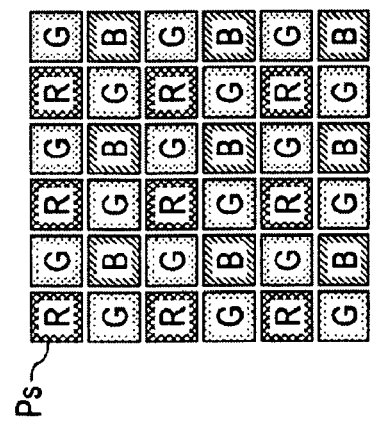

FIGS. 2A to 2E illustrate exemplary pixel arrays and exemplary arrangements of color filters in the CMOS image sensor 2. FIG. 2A illustrates a so-called Bayer array. In the Bayer array in FIG. 2A, many square pixels Ps are horizontally and vertically arranged. The color filters of red R and green G are alternately arranged so as to oppose the pixel cells for every two horizontal rows while the color filters of blue B and green G are alternately arranged so as to oppose the pixel cells in the remaining horizontal rows. In addition, the pixels having the color filters of red R are arranged so as not to be included in the same vertical columns in which the pixels having the color filters of blue B are arranged.

In the pixel arrays in FIGS. 2B and 2C, many diamond-shaped pixels Pd are horizontally and vertically arranged. In these pixel arrays, it is possible to set the apparent horizontal and vertical pixel pitch to a value lower than that in the Bayer array shown in FIG. 2A. The arrangement of the color filters in FIG. 2B is different from that of the color filters in FIG. 2C.

Specifically, in the pixel array in FIG. 2B, the color filters of red R and blue B are alternately arranged so as to oppose the pixel cells for every two horizontal rows, and the color filters of red R and blue B are also alternately arranged so as to oppose the pixel cells for every two vertical columns. Only the color filters of green G are arranged so as to oppose the pixel cells in the remaining horizontal rows and vertical columns.

In the pixel array in FIG. 2C, the color filters of red R and green G are alternately arranged so as to oppose the pixel cells for every four horizontal rows, and the color filters of blue B and green G are also alternately arranged so as to oppose the pixel cells for every other four horizontal rows. Only the color filters of green G are arranged so as to oppose the pixel cells in the remaining horizontal rows and vertical columns. The pixels having the color filters of red R are arranged so as not to be included in the same vertical columns in which the pixels having the color filters of blue B are arranged.

Figure 2D:
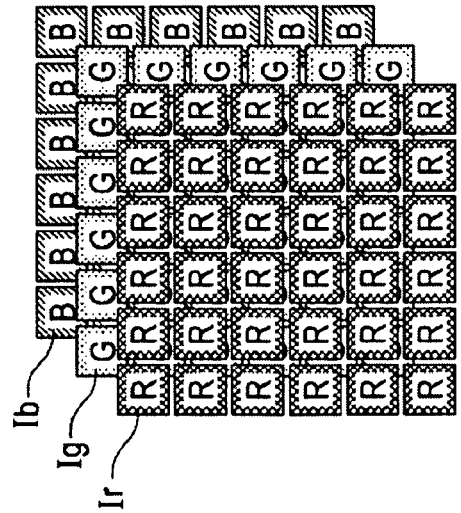

Although the exemplary arrays of the single-plate solid-state image pickup devices are shown in FIGS. 2A to 2C, the solid-state image pickup devices may have a three-plate structure in FIG. 2D or 2E, in which a solid-state image pickup device Ir is provided for red R, a solid-state image pickup device Ig is provided for green G, and a solid-state image pickup device Ib is provided for blue B. The solid-state image pickup devices Ir, Ig, and Ib in FIG. 2D each have many square pixels horizontally and vertically arranged thereon, as in the pixel array in FIG. 2A. The solid-state image pickup devices Ir, Ig, and Ib in FIG. 2E each have many diamond-shaped pixels horizontally and vertically arranged thereon, as in the pixel arrays in FIGS. 2B and 2C.

The CMOS image sensor 2 in FIG. 1 may have any of the pixel arrays in FIGS. 2A to 2E. According to the first embodiment, it is assumed that the CMOS image sensor 2 has the Bayer array in FIG. 2A for simplicity.

It is also assumed that the output from the CMOS image sensor 2 is transferred through one channel. Pixel data is read out from the CMOS image sensor 2 through one channel in a manner shown in FIG. 3. Specifically, the pixel data is read out from the multiple pixels Ps in the CMOS image sensor 2 for every row from left to right through one channel to scan the pixel array to the end of the row. After all the pixel data in one horizontal row has been read out, the pixel data is read out from the next row. The pixel array is similarly scanned horizontally in parallel to read out the pixel data from the entire screen.

In other words, the pixels are read out from the CMOS image sensor 2 in the order in which the pixel array is horizontally scanned.

Figure 3:
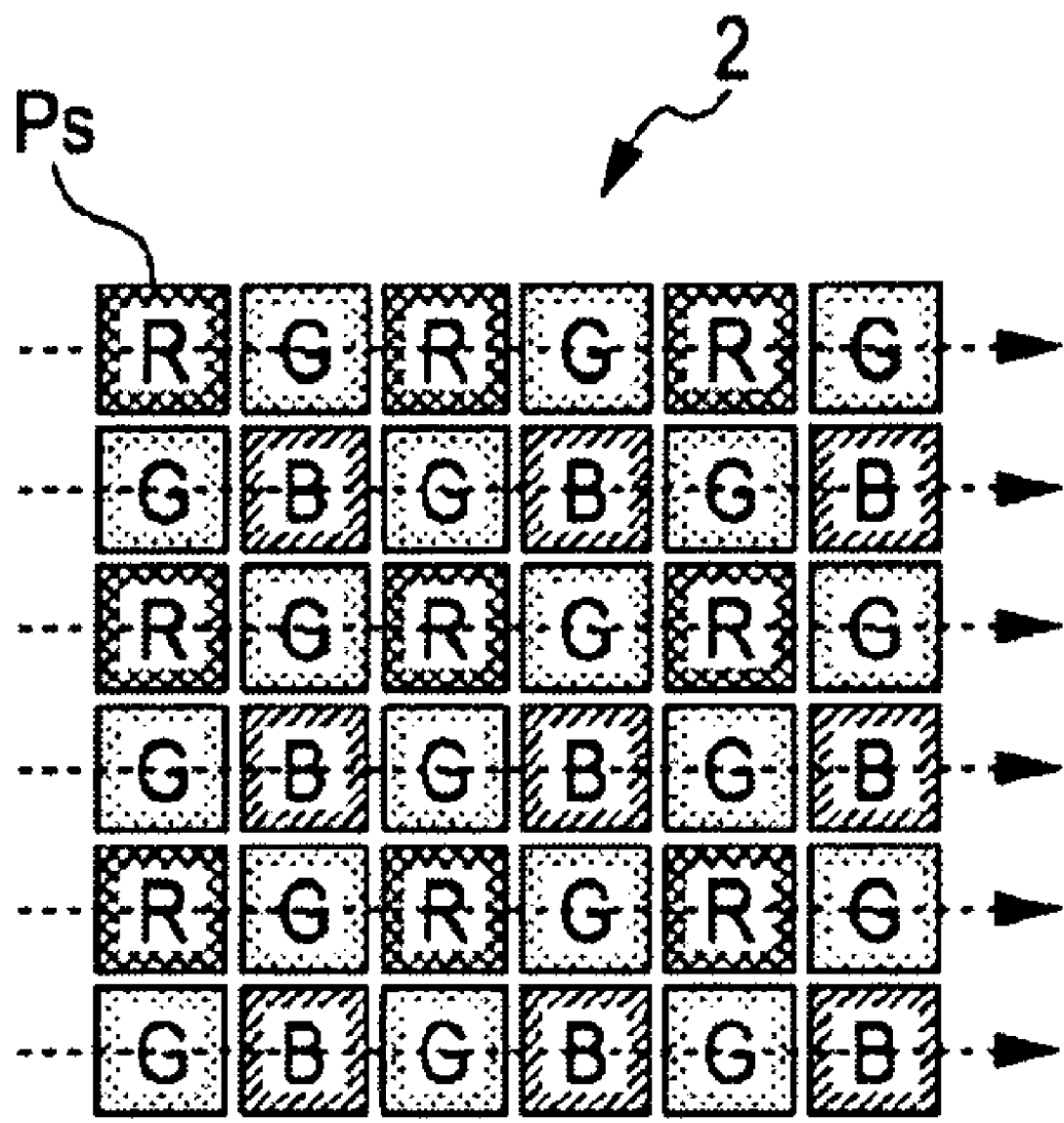
FIG. 3 is a diagram for description of how to read out captured image data from the solid-state image pickup device used in the image pickup apparatus according to the first embodiment of the present invention.

Although the CMOS image sensor is generally suitable not only for the one-channel readout but also for multi-channel parallel readout, the present invention does not depend on such readout methods. Although the readout sequence shown in FIG. 3 is exemplified in the first embodiment of the present invention for convenience, the present invention is not limited to this readout method. The embodiments of the present invention may be applied to another readout method.

The CMOS image sensor 2 according to the first embodiment has the pixel structure to which the pixel sharing technology described above is applied. FIGS. 4A to 4C illustrate three exemplary arrangement patterns of sharing pixels.

The arrangement patterns of the sharing pixels in the CMOS image sensor 2 are shown in the upper lines in FIGS. 4A to 4C. Multiple pixels connected with bold lines represent the sharing pixels.

The identifier (hereinafter referred to as the sharing pixel ID) at each pixel position in the arrangement pattern of the sharing pixels is shown in the medium lines in FIGS. 4A to 4C.

The sequences of the pixels output from the CMOS image sensor 2, represented by the sharing pixel IDs, are shown in the lower lines in FIGS. 4A to 4C. The output sequences of the sharing pixel IDs illustrated in the lower lines focus attention only on the arrangement patterns of the sharing pixels and the color filters corresponding to the pixels are not considered in the examples in FIGS. 4A to 4C.

FIG. 4A illustrates a case in which two pixels vertically adjacent to each other are processed as the sharing pixels. Specifically, the two pixels vertically arranged on the two adjacent horizontal rows are processed as the sharing pixels. Accordingly, "0" and "1" alternately appear for every horizontal row as the sharing pixel IDs, as shown in the medium line. All the pixels in one horizontal row in the pixel output sequence have the sharing pixel ID "0" and all the pixels in the next horizontal row in the pixel output sequence have the sharing pixel ID "1", as shown in the lower line.

FIG. 4B also illustrates the case in which two pixels vertically adjacent to each other are processed as the sharing pixels. However, in the arrangement pattern in FIG. 4B, a pair of the sharing pixels is shifted from the next pair of the sharing pixels by one vertical pixel. Accordingly, "0" and "1" alternately appear in each horizontal row as the sharing pixel IDs, and the appearance order of "0" and "1" in one horizontal row is reverse of that in the next horizontal row, as shown in the medium line. Similarly, "0" and "1" alternately appear in each horizontal row in the pixel output sequence represented as the sharing pixel IDs, and the appearance order of "0" and. "1" in one horizontal row is reverse of that in the next horizontal row, as shown in the lower line.

FIG. 4C illustrates a case in which four vertical pixels arranged in a zig-zag manner are processed as the sharing pixels. Accordingly, "0"s, "1"s, "2"s, and "3"s alternately appear for every four horizontal rows as the sharing pixel IDs, as shown in the medium line. Similarly, "0"s, "1"s, "2"s, and "3"s alternately appear for every four horizontal rows in the pixel output sequence represented as the sharing pixel IDs, as shown in the lower line.

Any of the arrangement patterns of the sharing pixels shown in FIGS. 4A to 4C may be adopted in the CMOS image sensor 2 according to the first embodiment of the present invention. It is assumed in the first embodiment that the CMOS image sensor 2 has the arrangement pattern of the sharing pixels shown in FIG. 4A.

Referring back to FIG. 1, light incident on the optical unit 1 is subjected to photoelectric conversion in the CMOS image sensor 2 having the above configuration and is output as an electrical signal, that is, captured image data. The CMOS image sensor 2 starts or stops readout of pixel data and controls the readout position in response to a control signal supplied from the camera control microcomputer 5.

The image data output from the CMOS image sensor 2 through one channel is supplied to the analog signal processing unit 3 where the image data is subjected to, for example, sample holding and automatic gain control. The image data is, then, subjected to analog-to-digital (A/D) conversion in the analog signal processing unit 3 and the digital signal is supplied to the digital signal processing unit 4.

Although the analog signal output from the CMOS image sensor 2 is subjected to the sample holding, the automatic gain control, and the A/D conversion in the analog signal processing unit 3 in the above description, the configuration of the analog signal processing unit 3 may be incorporated in the CMOS image sensor 2.

The digital signal processing unit 4 converts a captured image data RAW (raw data) supplied from the analog signal processing unit 3 into digital pixel data and performs a variety of signal processing to the digital pixel data resulting from the conversion in response to an instruction from the camera control microcomputer 5. The variety of signal processing performed in the digital signal processing unit 4 includes so-called camera signal processing, such as white balancing, gamma correction, and color difference signal processing, and arithmetic processing for camera control detection data (data about captured images on the screen, such as brightness, contrast, and hue).

The digital signal processing unit 4 includes a reference-timing-signal generating part, as described below, which generates various timing signals. The timing signals include a horizontal synchronization signal HD and a vertical synchronization signal VD for the captured image data. The digital signal processing unit 4 supplies the horizontal synchronization signal HD, the vertical synchronization signal VD, and other necessary timing signals to the CMOS image sensor 2. The timing signals from the reference-timing-signal generating part in the digital signal processing unit 4 are also supplied to the camera control microcomputer 5.

The CMOS image sensor 2 is provided with a reader and a readout-timing-signal generator in order to read out pixel data from each pixel by the readout method shown in FIG. 3. The readout-timing-signal generator in the CMOS image sensor 2 generates a readout timing signal in synchronization with the horizontal synchronization signal HD and the vertical synchronization signal VD received from the digital signal processing unit 4 and reads out the pixel data from the CMOS image sensor 2 on the basis of the control signal supplied from the camera control microcomputer 5.

According to the first embodiment of the present invention, the digital signal processing unit 4 also includes a sharing-pixel pixel mixture correcting part to correct the pixel mixture in consideration of the unevenness of the sharing pixels. The sharing-pixel pixel mixture correcting part will be described in detail below.

The camera control microcomputer 5 determines the state of the current captured image from detection data supplied from the digital signal processing unit 4 and camera shake information about the image pickup apparatus 10, supplied from the camera shake sensor 6, to control the image pickup apparatus 10 in accordance with various setting modes supplied through the human interface microcomputer 8. Specifically, the camera control microcomputer 5 supplies readout area specification data to the CMOS image sensor 2, captured image control data to the digital signal processing unit 4, lens control data to the lens driver unit 7, and gain control data for the automatic gain control to the analog signal processing unit 3.

The CMOS image sensor 2 sequentially reads out signals corresponding to a certain area specified with the readout area specification data in the image capturing area of the CMOS image sensor 2 in response to the readout timing signal and supplies the readout signals to the analog signal processing unit 3.

The digital signal processing unit 4, the lens driver unit 7, and the analog signal processing unit 3 perform processing corresponding to the control values supplied from the camera control microcomputer 5 to realize desired signal processing, timing signal generation, lens drive, and gain control.

The user interface unit 9 includes a key operation part receiving an operation input by a user and a display device in which the mode of the image pickup apparatus 10 and camera information are displayed. For example, a menu operation by the user is controlled by the human interface microcomputer 8 through the user interface unit 9.

The human interface microcomputer 8 detects which image capturing mode the user currently selects or which control the user wants on the basis of an instruction input by the user with the user interface unit 9 and supplies the detection result to the camera control microcomputer 5 as user instruction information.

Concurrently, the camera control microcomputer 5 supplies camera control information (the distance to the subject, the F-number, the shutter speed, and the magnification) that is acquired to the human interface microcomputer 8 and indicates the current camera information to the user with the display device of the user interface unit 9. A detailed description of such components is omitted herein because they are not directly related to the present invention.

Figure 5:
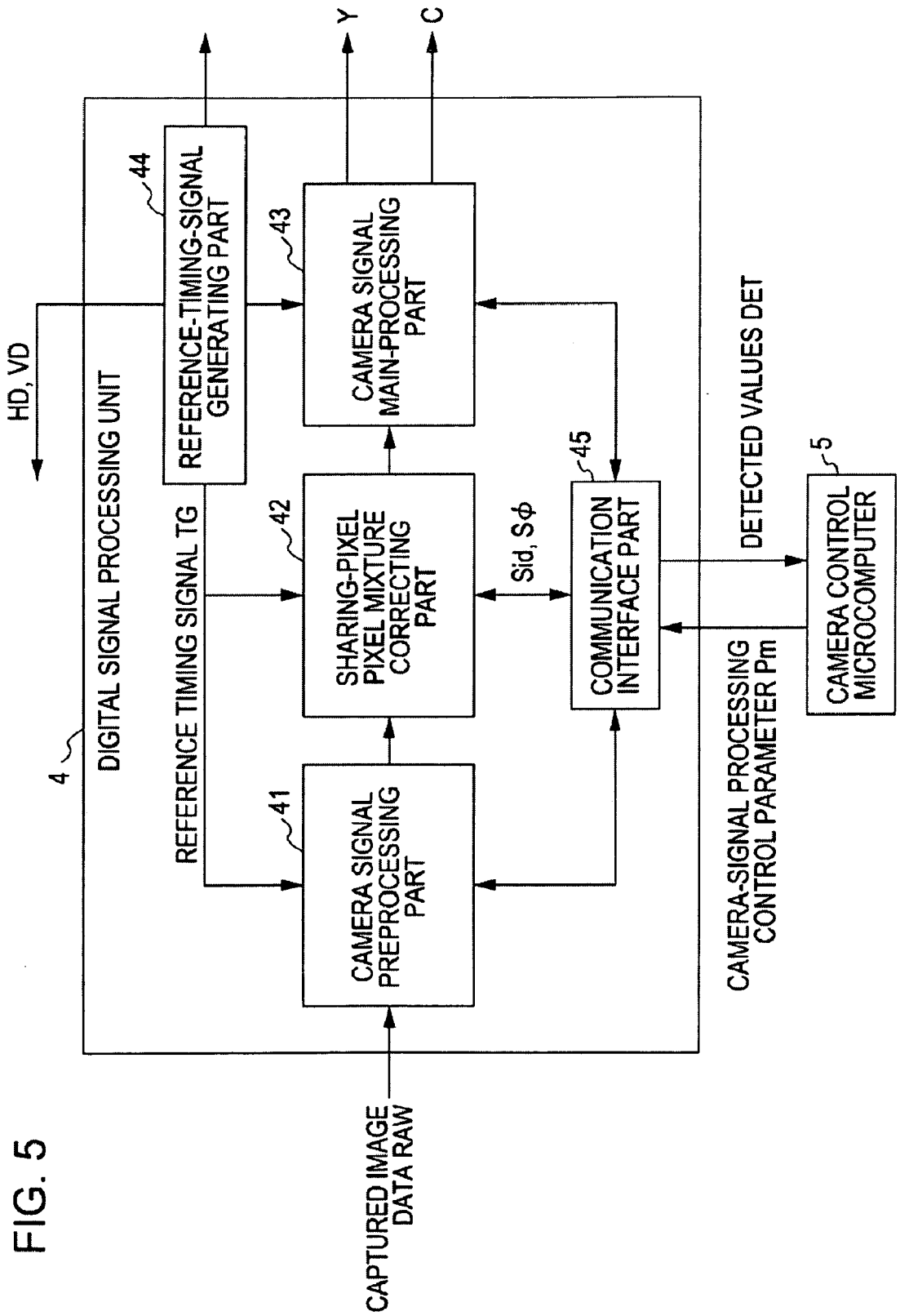
FIG. 5 is a block diagram showing an example of the configuration of a main component in the image pickup apparatus according to the first embodiment of the present invention.

FIG. 5 is a block diagram showing in detail an example of the configuration of the digital signal processing unit 4. In the example shown in FIG. 5, the digital signal processing unit 4 includes a camera signal preprocessing part 41, a sharing-pixel pixel mixture correcting part 42, a camera signal main-processing part 43, a reference-timing-signal generating part 44, and a communication interface part 45.

The reference-timing-signal generating part 44 generates the horizontal synchronization signal HD and the vertical synchronization signal VD described above to supply the generated horizontal synchronization signal HD and vertical synchronization signal VD to the CMOS image sensor 2 and supplies a reference timing signal TG on which the pixel timing is based to the camera signal preprocessing part 41 and the sharing-pixel pixel mixture correcting part 42. In addition, the reference-timing-signal generating part 44 supplies various timing signals to the camera signal main-processing part 43. The reference-timing-signal generating part 44 also supplies the various timing signals to the camera control microcomputer 5, although not shown in FIG. 5.

The communication interface part 45 supplies various detected values DET supplied from the camera signal main-processing part 43 to the camera control microcomputer 5. The camera control microcomputer 5 generates a control signal, such as an automatic gain control signal, on the basis of the received various detected values DET and supplies the control signal to the corresponding processing unit.

In addition, the communication interface part 45 receives a camera-signal processing control parameter Pm from the camera control microcomputer 5 and supplies necessary control signals to the camera signal preprocessing part 41, the sharing-pixel pixel mixture correcting part 42, and the camera signal main-processing part 43. Accordingly, the processing operations of the camera signal preprocessing part 41, the sharing-pixel pixel mixture correcting part 42, and the camera signal main-processing part 43 are controlled by the camera control microcomputer 5.

The camera signal preprocessing part 41 receives the captured image data RAW from the analog signal processing unit 3 to perform a series of processing, such as digital clamping, necessary to be performed as the pre-processing of the pixel mixture correction. A detailed description of the series of processing performed by the camera signal preprocessing part 41 is omitted herein because they are not directly related to the present invention.

The output from the camera signal preprocessing part 41 is supplied to the sharing-pixel pixel mixture correcting part 42. The sharing-pixel pixel mixture correcting part 42 corrects the pixel mixture for every sharing pixel (for every pixel having the same sharing pixel ID).

Information about the sharing pixel IDs described above with reference to FIGS. 4A to 4C, that is, sharing pixel ID setting information Sid is supplied from the camera control microcomputer 5 to the sharing-pixel pixel mixture correcting part 42 through the communication interface part 45. In addition, as described below, a set of correction parameter groups (a set of correction factor groups) Sφ used for the pixel mixture correction is supplied from the camera control microcomputer 5 to the sharing-pixel pixel mixture correcting part 42 through the communication interface part 45.

The camera control microcomputer 5 generates a correction parameter group (a correction factor group) used for the pixel mixture correction for every sharing pixel (for every pixel having the same sharing pixel ID) and stores the generated correction parameter group in, for example, its own memory. Accordingly, the set of correction parameter groups (the set of correction factor groups) Sφ includes the multiple correction parameter groups (the multiple correction factor groups) of the number corresponding to the number of the sharing pixels.

The sharing-pixel pixel mixture correcting part 42 performs the pixel mixture correction to the captured image data RAW supplied from the camera signal preprocessing part 41 by using the correction parameter group selected from the set of correction parameter groups Sφ acquired through the communication interface part 45. Specifically, the sharing-pixel pixel mixture correcting part 42 determines which sharing pixel the pixel supplied from the camera signal preprocessing part 41 corresponds to (recognizes the sharing pixel ID of the pixel) on the basis of the sharing pixel ID setting information Sid, selects a correction parameter group (a correction factor group) for the sharing pixel from the set of correction parameter groups Sφ on the basis of the determination result, and performs the pixel mixture correction by using the selected correction parameter group (correction factor group). Then, the sharing-pixel pixel mixture correcting part 42 supplies the pixel data subjected to the pixel mixture correction to the camera signal main-processing part 43.

The camera signal main-processing part 43 performs a variety of camera signal processing, such as noise reduction, defect correction, demosaicing, white balancing, and resolution conversion, in the related art in response to a control instruction from the camera control microcomputer 5 through the communication interface part 45 and supplies luminance data Y and color data C, which are output data, to the downstream video processing block (not shown). A detailed description of the camera signal processing part 43 is omitted herein because it is not directly related to the present invention.

Before describing an example of the configuration of the sharing-pixel pixel mixture correcting part 42 according to the first embodiment, an outline of the pixel mixture correction for every sharing pixel according to the first embodiment will now be described with reference to FIG. 6. The method of correcting the pixel mixture described here is only an example and the correction method of the pixel mixture is not restricted to the one described with reference to FIG. 6.

Figure 6C:
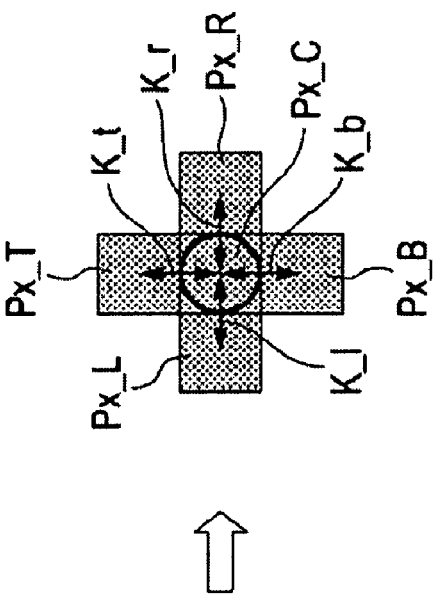
FIGS. 6A to 6C are diagrams for description of the image pickup apparatus according to the first embodiment of the present invention.

As described above, the pixel mixture is caused by the leakage of light that should be incident on a target pixel from the target pixel into adjacent pixels around the target pixel and the leakage of light that should be incident on the adjacent pixels into the target pixel. Accordingly, in the color filters having the Bayer array shown in FIG. 2A, it is assumed that a color mixture range AR includes eight pixels around a target pixel Px_C (a pixel to be corrected: surrounded by a circle in FIG. 6A), as shown in FIG. 6A. The color filters in the Bayer array shown in FIG. 2A are exemplified in the description with reference to FIGS. 6A to 6C.

Figure 6B:
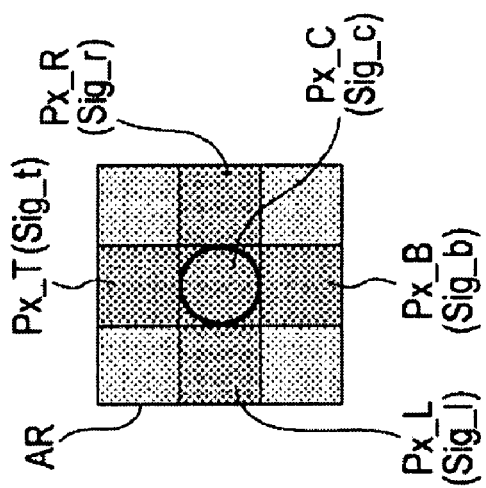
Figure 6A:
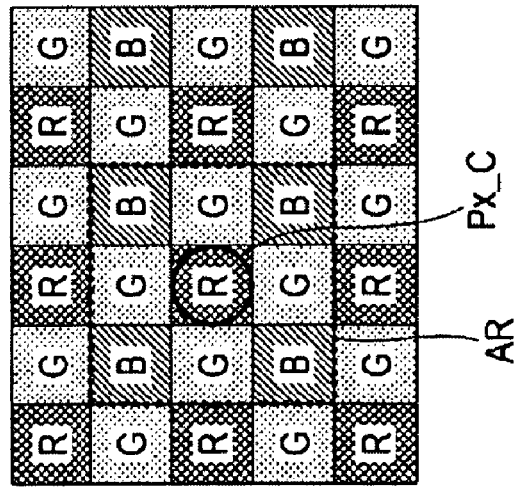

Of the eight pixels within the color mixture range AR, the distance from the target pixel Px_C to the pixels arranged in oblique directions with respect to the target pixel Px_C is $\sqrt{2}$ times longer than the distance from the target pixel Px_C to the top, bottom, left, and right pixels Px_T, Px_B, Px_L, and Px_R with respect to the target pixel Px_C (refer to FIG. 6B). Accordingly, the degree of effect of the color mixture on the top, bottom, left, and right pixels Px_T, Px_B, Px_L, and Px_R is higher than that on the remaining pixels (refer to FIG. 6B). For this reason, the color mixture with the pixels arranged in oblique directions with respect to the target pixel Px_C is considered to be disregarded and is excluded in the description of the pixel mixture correction here.

Consequently, attention is focused only on the pixel mixture with the top, bottom, left, and right pixels Px_T, Px_B, Px_L, and Px_R with respect to the target pixel Px_C in this example and the following correction models are used to compose a circuit to reduce the color mixture: When light leaks from the target pixel into the adjacent pixels by an amount corresponding to the color mixture ratio, the amount of light leaking from the target pixel is added to the amount of light.

When light leaks from the adjacent pixels into the target pixel by an amount corresponding to the color mixture ratio, the amount of light leaking into the target pixel is subtracted from the amount of light.

In other words, the pixel mixture correction is performed in accordance with the difference between the level of the target pixel and the level of the adjacent pixels because the amount of color mixture is increased as the difference between the level of the target pixel and the level of the adjacent pixels is increased. Although this method of correcting the pixel mixture is disclosed in Japanese Unexamined Patent Application Publication No. 2007-142697, the embodiments of the present invention differs from the above method in that the "correction parameter" applied to the correction circuit is switched for every sharing pixel.

The above pixel mixture correction will now be described by using a correction equation. A value Sig_c' of the pixel signal from the target pixel Px_C after the pixel mixture correction can be calculated according to Equation (1), where the value of the pixel signal from the target pixel Px_C is denoted by Sig_c, the value of the pixel signal from the top adjacent pixel Px_T is denoted by Sig_t, the value of the pixel signal from the bottom adjacent pixel Px_B is denoted by Sig_b, the value of the pixel signal from the left adjacent pixel Px_L is denoted by Sig_l, and the value of the pixel signal from the right adjacent pixel Px_R is denoted by Sig_r, as shown in FIG. 6B, and where the color mixture ratios between the target pixel Px_C and the top, bottom, left, and right adjacent pixels Px_T, Px_B, Px_L, and Px_R are denoted by K_t, K_b, K_l, and K_r, respectively, as shown in FIG. 6C.

$$\text{Sig\_c}' = \text{Sig\_c} + \text{K\_t}(\text{Sig\_c} - \text{Sig\_t}) + \quad (1)$$
$$\text{K\_r}(\text{Sig\_c} - \text{Sig\_r}) + \text{K\_l}(\text{Sig\_c} - \text{Sig\_l}) + \text{K\_b}(\text{Sig\_c} - \text{Sig\_b})$$

The color mixture ratios K_t, K_b, K_l, and K_r correspond to the correction parameters (correction factors) for the top, bottom, left, and right adjacent pixels Px_T, Px_B, Px_L, and Px_R. In this example, the four correction parameters (correction factors) K_t, K_b, K_l, and K_r for the top, bottom, left, and right adjacent pixels Px_T, Px_B, Px_L, and Px_R form one set.

When the color filters have the Bayer array, the pixel to which the red filter is allocated, the pixel to which the blue filter is allocated, or the pixel to which the green filter is allocated is used as the target pixel. The green filter is allocated to all the adjacent pixels around the pixels to which the red color filter is allocated and to which the blue filter is allocated, as shown in FIG. 2A.

In contrast, the pixels to which the green filters are allocated are divided into two types: (1) the red filters are allocated to the left and right adjacent pixels and the blue filters are allocated to the top and bottom adjacent pixels and (2) the blue filters are allocated to the left and right adjacent pixels and the red filters are allocated to the top and bottom adjacent pixels.

Accordingly, the target pixels can be divided into four types shown in FIGS. 7A to 7D. Referring to FIGS. 7A to 7D, a pixel to which the red filter is allocated is denoted by R, a pixel to which the blue filter is allocated is denoted by B, a pixel to which the green filter is allocated and which has the left and right adjacent pixels to which the red filter is allocated is denoted by Gr, and a pixel to which the green filter is allocated and which has the left and right adjacent pixels to which the blue filter is allocated is denoted by Gb.

Although the color mixture ratios K_t, K_b, K_l, and K_r may be set for the respective target pixels of the four types, it is assumed in the examples shown in FIGS. 7A to 7D for simplicity that the color mixture is performed in the same manner (the same color mixture characteristics are provided) in the target pixels of the four types at any of the color mixture ratios K_t, K_b, K_l, and K_r. In other words, the same color mixture ratio is used regardless of the types of the target pixels.

As described above, the pixels belonging to three horizontal rows should be used in the pixel mixture correction shown in FIGS. 7A to 7D. Accordingly, in the pixel mixture correction in the sharing-pixel pixel mixture correcting part 42 described below, a signal of the horizontal row to which the target pixel belongs is referred to as a target row signal Sig_HC (refer to FIG. 7A) that delays for the time corresponding to one horizontal row with respect to the signal supplied from the analog signal processing unit 3.

A signal of the horizontal row including the top pixel with respect to the target pixel is referred to as a top row signal Sig_HT (refer to FIG. 7A) that delays for the time corresponding to two horizontal rows with respect to the signal supplied from the analog signal processing unit 3. A signal of the horizontal row including the bottom pixel with respect to the target pixel corresponds to the signal supplied from the analog signal processing unit 3 and is referred to as a bottom row signal Sig_HB (refer to FIG. 7A).

A signal from the target pixel delays for the time corresponding to one pixel clock (1D) with respect to the target row signal Sig_HC as shown in FIG. 7A, where "D" denotes the amount of delay corresponding to one pixel clock. A signal from the pixel at the left side of the target pixel delays for the time corresponding to two pixel clocks (2D) with respect to the target row signal Sig_HC. A signal from the pixel at the right side of the target pixel corresponds to the target row signal Sig_HC, that is, delays for zero (0D).

A signal from the pixel at the upper side of the target pixel delays for the time corresponding to one pixel clock (1D) with respect to the top row signal Sig_HT. A signal from the pixel at the lower side of the target pixel delays for the time corresponding to one pixel clock (1D) with respect to the bottom row signal Sig_HB.

Figure 8:
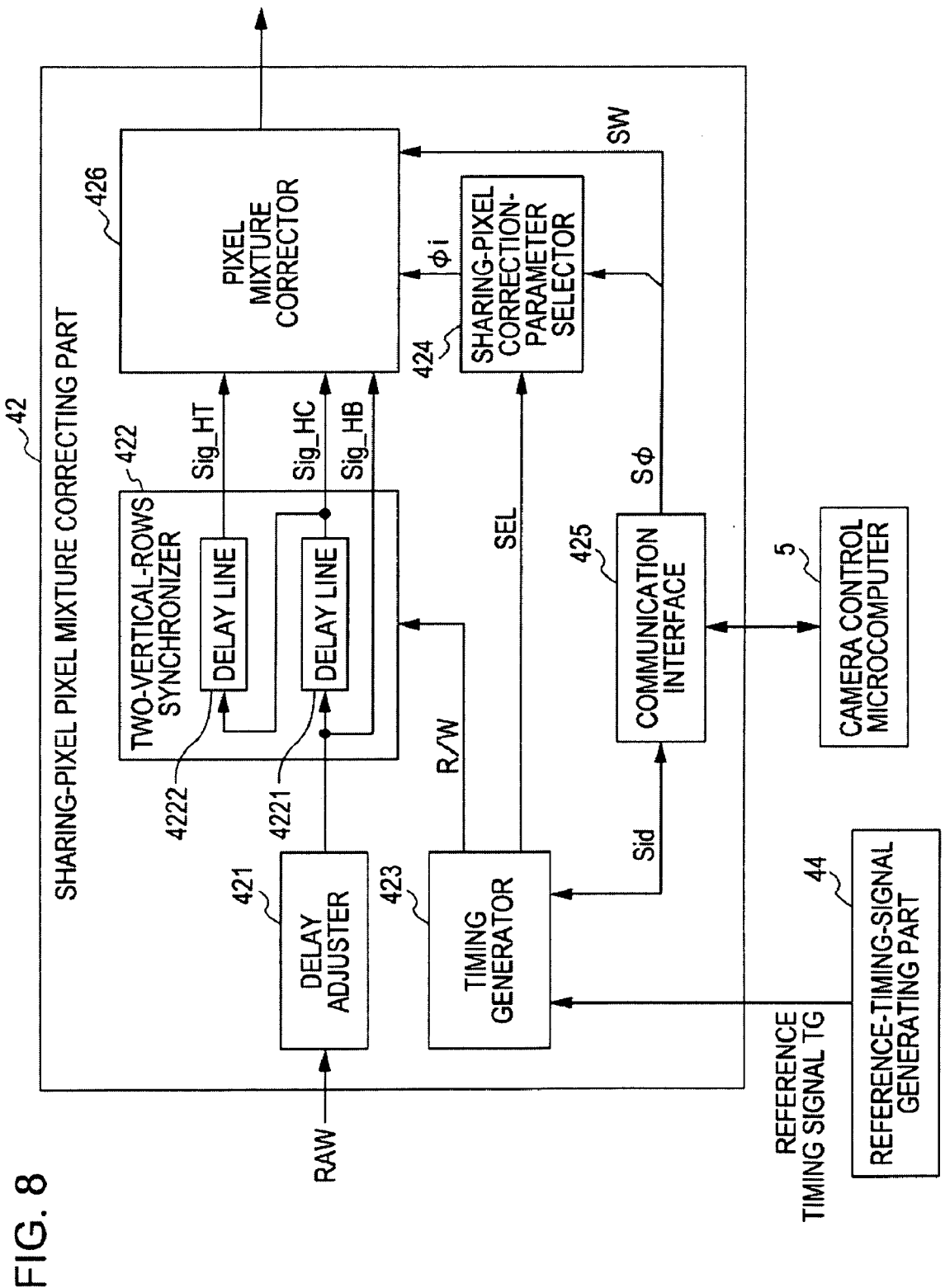
FIG. 8 is a block diagram showing in detail an example of the configuration of a part in the example of the configuration shown in FIG. 5.

FIG. 8 is a block diagram showing in detail an example of the configuration of the sharing-pixel pixel mixture correcting part 42 performing the pixel mixture correction described above. The sharing-pixel pixel mixture correcting part 42 includes a delay adjuster 421 provided for the captured image data RAW, which is a main line signal, a two-vertical-rows synchronizer 422, a timing generator 423, a sharing-pixel correction-parameter selector 424, a communication interface 425, and a pixel mixture corrector 426.

The delay adjuster 421 adds the time corresponding to the delay caused by the processing in the timing generator 423 and the sharing-pixel correction-parameter selector 424 to the captured image data RAW, which is the main line signal and which is supplied from the camera signal preprocessing part 41, to adjust the timing when the pixel mixture correction for every sharing pixel described below is performed in the pixel mixture corrector 426.

The two-vertical-rows synchronizer 422 receives the signal supplied from the delay adjuster 421 and synchronously outputs the signals corresponding to the three horizontal rows, which are necessary for the pixel mixture correction. The two-vertical-rows synchronizer 422 includes two delay lines 4221 and 4222 each corresponding to one horizontal row, as shown in FIG. 8. The delay lines 4221 and 4222 each include a static random access memory (SRAM).

Figure 9:
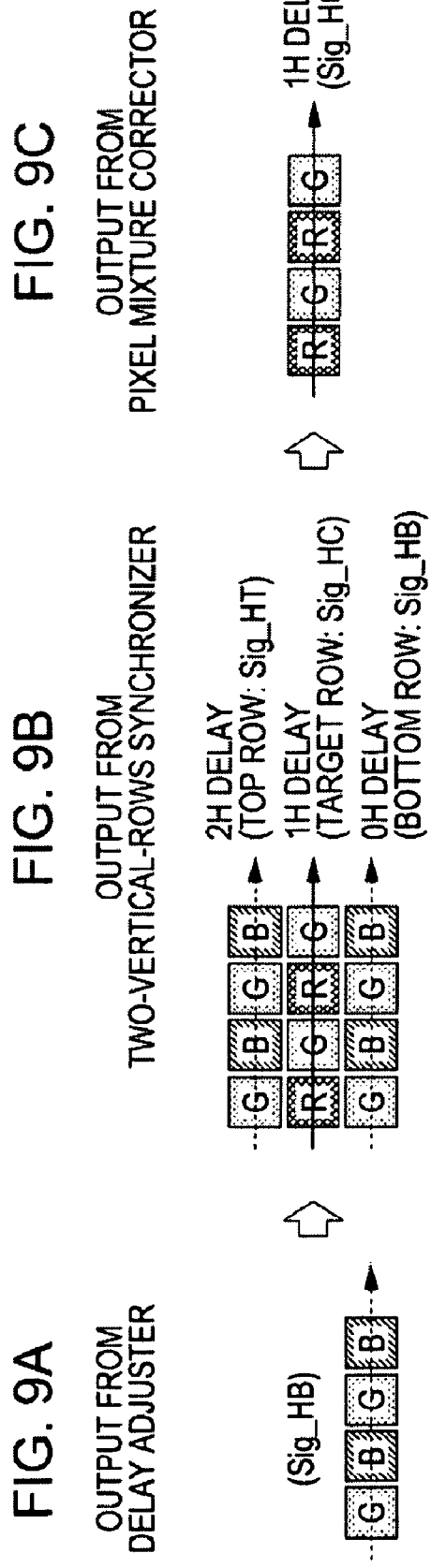
FIGS. 9A to 9C are diagrams for description of outputs from processors in the example of the configuration shown in FIG. 8.

A signal output from the delay adjuster 421 (refer to FIG. 9A) is supplied to the pixel mixture corrector 426 as the bottom row signal Sig_HB (refer to FIG. 9B) with no delay in the two-vertical-rows synchronizer 422 and is supplied to the pixel mixture corrector 426 as the target row signal Sig_HC (refer to FIG. 9B) with a delay corresponding to one horizontal row in the delay line 4221. In addition, the target row signal Sig_HC from the delay line 4221 is supplied to the pixel mixture corrector 426 as the top row signal Sig_HT (refer to FIG. 98) with a delay corresponding to another one horizontal row in the delay line 4222. Referring to FIG. 9B, the "H" in the 0H delay, the 1H delay, and the 2H delay denotes the amount of data (or time length) corresponding to one horizontal row (one horizontal segment).

The pixel mixture corrector 426 performs the pixel mixture correction for every sharing pixel described below and outputs a target row signal Sig_HC' after the correction (refer to FIG. 9C) that is delayed for the time corresponding to one horizontal row with respect to the output from the delay adjuster 421.

The timing generator 423 generates a selection control signal of the correction parameter for every sharing pixel based on the sharing pixel IDs (referred to as a parameter selection signal) SEL on the basis of the reference timing signal TG supplied from the reference-timing-signal generating part 44 and the sharing pixel ID setting information Sid supplied from the camera control microcomputer 5 through the communication interface 425 and supplies the generated parameter selection signal SEL to the sharing-pixel correction-parameter selector 424.

In addition, the timing generator 423 supplies a writing-readout control signal R/W to the SRAM in the two-vertical-rows synchronizer 422. The timing generator 423 supplies pixel clocks CLK to each of the delay adjuster 421, the two-vertical-rows synchronizer 422, the sharing-pixel correction-parameter selector 424, the communication interface 425, and the pixel mixture corrector 426, although not shown in FIG. 8.

The sharing-pixel correction-parameter selector 424 receives the set of correction parameter groups Sφ from the camera control microcomputer 5 through the communication interface 425. The number of groups in the set of correction parameter groups Sφ corresponds to the number of the sharing pixels. The set of correction parameter groups Sφ includes the correction parameter groups corresponding to the color mixture ratios K_t, K_b, K_l, and K_r between the target pixel Px_C and the top, bottom, left, and right adjacent pixels Px_T, Px_B, Px_L, and Px_R (the correction factor groups corresponding to the color mixture characteristics between the target pixel and the top, bottom, left, and right adjacent-pixels), as described above. The number of the correction parameter groups corresponds to the number of the sharing pixels.

The sharing-pixel correction-parameter selector 424 selects a set of correction parameters (a set of correction factors) from the set of correction parameter groups Sφ in accordance with which pixel in the sharing pixels the target pixel to be corrected in the pixel mixture corrector 426 corresponds to in response to the parameter selection signal SEL supplied from the timing generator 423 and supplies the selected set of correction parameters to the pixel mixture corrector 426.

Figure 10:
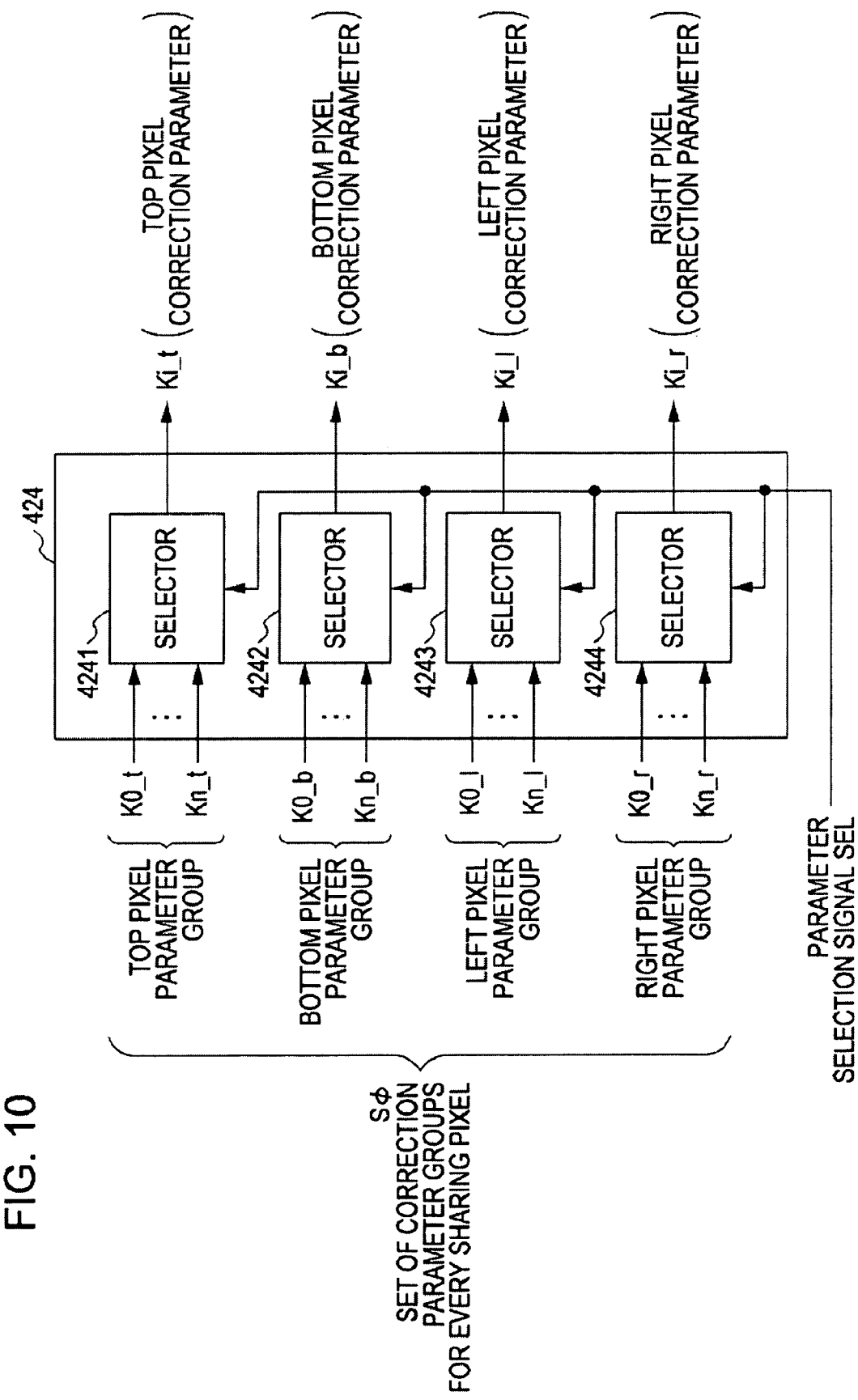
FIG. 10 illustrates an example of the configuration of another processor in the example of the configuration shown in FIG. 8.

FIG. 10 illustrates an example of the configuration of the sharing-pixel correction-parameter selector 424. The sharing-pixel correction-parameter selector 424 includes four selectors 4241, 4242, 4243, and 4244 to select the correction parameter group (the correction factor group) corresponding to the color mixture characteristics between the target pixel and the top, bottom, left, and right adjacent pixels.

The correction parameter group including $K0\_t$, $K2\_t$, $Kn\_t$ is supplied to the selector 4241, the correction parameter group including $K0\_b$, $K2\_b$, ..., $Kn\_b$ is supplied to the selector 4242, the correction parameter group including $K0\_l$, $K2\_l$, ..., $Kn\_l$ is supplied to the selector 4243, and the correction parameter group including $K0\_r$, $K2\_r$, ..., $Kn\_r$ is supplied to the selector 4244. The number of the correction parameter groups is equal to (n+1:n is an integer greater than or equal to one) corresponding to the number (n+1) of the sharing pixels. In the example illustrated in FIG. 10, the correction parameter groups for the top, bottom, left, and right adjacent pixels are supplied to the sharing-pixel correction-parameter selector 424.

The parameter selection signal SEL is supplied from the timing generator 423 to each of the selectors 4241, 4242, 4243, and 4244.

In the above configuration, each of the selectors 4241, 4242, 4243, and 4244 selects and extracts the correction parameter in accordance with which pixel in the sharing pixels the target pixel to be corrected in the pixel mixture corrector 426 corresponds to. In other words, the correction parameter corresponding to the sharing pixel ID of the target pixel is output from each of the selectors 4241, 4242, 4243, and 4244.

The correction parameters extracted from the selectors 4241, 4242, 4243, and 4244 are denoted by $Ki\_t$, $Ki\_b$, $Ki\_l$, and $Ki\_r$, respectively. The "i" in the correction parameters $Ki\_t$, $Ki\_b$, $Ki\_l$, and $Ki\_r$ indicates, for example, that the target pixel is the i-th pixel from the beginning of one frame. The "i" has the same meaning in the following description.

A set of correction parameters φi for the target pixels, that is, the correction parameters $Ki\_t$, $Ki\_b$, $Ki\_l$, and $Ki\_r$ extracted from the sharing-pixel correction-parameter selector 424 are supplied to the pixel mixture corrector 426.

The pixel mixture corrector 426 uses the received set of correction parameters φi to perform the pixel mixture correction described above. Specifically, the pixel mixture corrector 426 extracts the target pixel and the top, bottom, left, and right adjacent pixels with respect to the target pixel from the signals of the three rows synchronized by the two-vertical-rows synchronizer 422 and performs the correction calculation using the correction parameters $Ki\_t$, $Ki\_b$, $Ki\_l$, and $Ki\_r$ to the signals from the extracted pixels.

According to the first embodiment, a correction on-off control signal SW is supplied from the camera control microcomputer 5 to the pixel mixture corrector 426 through the communication interface 423. The pixel mixture corrector 426 switches between a case where the pixel mixture correction is performed and a case where the pixel mixture correction is not performed in response to the correction on-off control signal SW.

Figure 11:
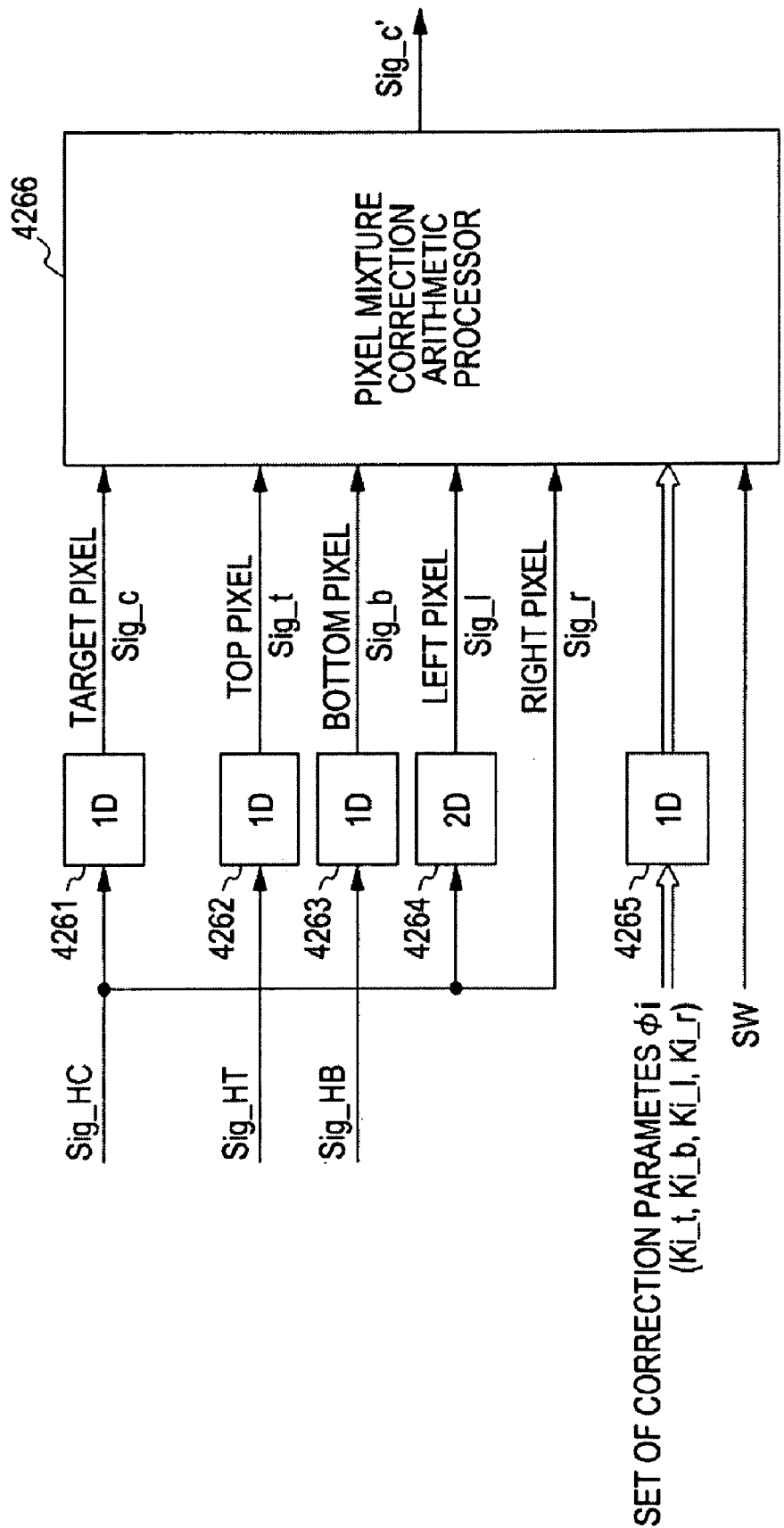
FIG. 11 is a block diagram showing an example of the configuration of another processor in the example of the configuration shown in FIG. 8.

FIG. 11 is a block diagram showing an example of the configuration of the pixel mixture corrector 426. Referring to FIG. 11, the pixel mixture corrector 426 includes four delay circuits 4261, 4262, 4263, and 4265 for the time corresponding to one pixel clock, one delay circuit 4264 for the time corresponding to two pixel clocks, and a pixel mixture correction arithmetic processor 4266.

The target row signal Sig_HC is supplied from the two-vertical-rows synchronizer 422 to the delay circuit 4261 to be delayed for the time corresponding to one pixel clock. The correction target pixel signal Sig_c is output from the delay circuit 4261 and is supplied to the pixel mixture correction arithmetic processor 4266.

The top row signal Sig_HT' is supplied from the two-vertical-rows synchronizer 422 to the delay circuit 4262 to be delayed for the time corresponding to one pixel clock. The top pixel signal Sig_t is output from the delay circuit 4262 and is supplied to the pixel mixture correction arithmetic processor 4266.

The bottom row signal Sig_HB is supplied from the two-vertical-rows synchronizer 422 to the delay circuit 4263 to be delayed for the time corresponding to one pixel clock. The bottom pixel signal Sig_b is output from the delay circuit 4263 and is supplied to the pixel mixture correction arithmetic processor 4266.

The target row signal Sig_HC is supplied from the two-vertical-rows synchronizer 422 to the delay circuit 4264 to be delayed for the time corresponding to two pixel clocks. The left pixel signal Sig_l is output from the delay circuit 4264 and is supplied to the pixel mixture correction arithmetic processor 4266.

The target row signal Sig_HC is supplied from the two-vertical-rows synchronizer 422 to the pixel mixture correction arithmetic processor 4266 as the right pixel signal Sig_r with no delay.

The set of correction parameters φi is supplied to the delay circuit 4265 to be delayed for the time corresponding to one pixel clock. As the result of the delay, the target pixel (the pixel to be corrected) is synchronized with the set of correction parameters φi and the set of correction parameters φi synchronized with the target pixel is supplied to the pixel mixture correction arithmetic processor 4266. Although one delay circuit 4265 is shown in the example shown in FIG. 11, the delay circuit 4265 is practically composed of four delay circuits because the set of correction parameters φi includes the four correction parameters Ki_t, Ki_b, Ki_l, and Ki_r.

Figure 12:
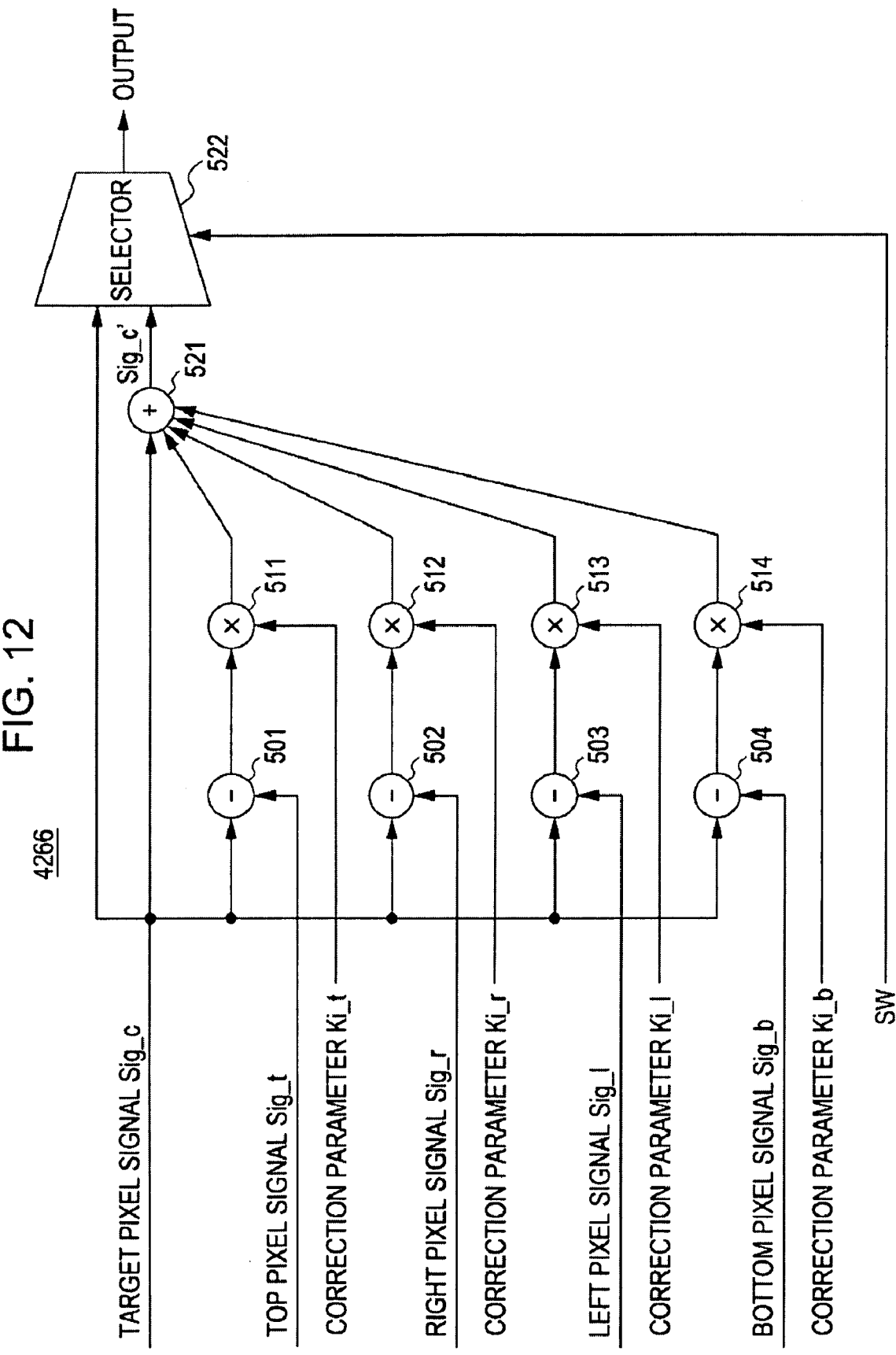
FIG. 12 illustrates an example of the configuration of another processor in the example of the configuration shown in FIG. 11.

FIG. 12 illustrates an example of the configuration of the pixel mixture correction arithmetic processor 4266. Referring to FIG. 12, the pixel mixture correction arithmetic processor 4266 includes subtractor circuits 501, 502, 503, and 504, multiplier circuits 511, 512, 513, and 514, an adder circuit 521, and a selector 522.

The subtractor circuit 501 calculates the difference between the correction target pixel signal Sig_c and the top pixel signal Sig_t and supplies the difference to the multiplier circuit 511. The multiplier circuit 511 multiplies the difference between the correction target pixel signal Sig_c and the top pixel signal Sig_t by the correction parameter Ki_t for the top adjacent pixel that is supplied and supplies the multiplication result to the adder circuit 521.

The subtractor circuit 502 calculates the difference between the correction target pixel signal Sig_c and the right pixel signal Sig_r and supplies the difference to the multiplier circuit 512. The multiplier circuit 512 multiplies the difference between the correction target pixel signal Sig_c and the right pixel signal Sig_r by the correction parameter Ki_r for the right adjacent pixel that is supplied and supplies the multiplication result to the adder circuit 521.

The subtractor circuit 503 calculates the difference between the correction target pixel signal Sig_c and the left pixel signal Sig_l and supplies the difference to the multiplier circuit 513. The multiplier circuit 513 multiplies the difference between the correction target pixel signal Sig_c and the left pixel signal Sig_l by the correction parameter Ki_l for the left adjacent pixel that is supplied and supplies the multiplication result to the adder circuit 521.

The subtractor circuit 504 calculates the difference between the correction target pixel signal Sig_c and the bottom pixel signal Sig_b and supplies the difference to the multiplier circuit 514. The multiplier circuit 514 multiplies the difference between the correction target pixel signal Sig_c and the bottom pixel signal Sig_b by the correction parameter Ki_b for the bottom adjacent pixel that is supplied and supplies the multiplication result to the adder circuit 521.

The correction target pixel signal Sig_c is directly supplied to the adder circuit 521. The adder circuit 521 adds the supplied signals together to generate the output signal Sig_c', which is the calculation result of Equation (1), and supplies the output signal Sig_c' to the selector 522.

The correction on-off control signal SW is supplied from the camera control microcomputer 5 to the selector 522 through the communication interface 425. When the correction is activated, the output signal Sig_c' from the adder circuit 521, resulting from the pixel mixture correction calculation, is output from the selector 522. When the correction is inactivated, the selector 522 is controlled so as to output the correction target pixel signal Sig_c without the correction.

In the case of the image pickup device in which the pixel mixture does not occur, the inactivation of the pixel mixture correction in the correction on-off control easily prevents, for example, the inverse correction from occurring. In addition, since it is possible to cause the pixel mixture not to occur when the aperture is sufficiently narrow, as described above with reference to FIG. 18B, the pixel mixture correction may be controlled so as to be inactive in such a case.

In the correction on-off control, the values of all the correction parameters may be set to zero, instead of the switching by the selector 522 as in the example illustrated in FIG. 12, when the correction is inactivated.

As described above, according to the first embodiment, it is possible to perform the correction using the independent correction parameter for every sharing pixel while providing the advantages of the real-time control of the amount of correction in the pixel mixture correction from the external camera control microcomputer 5 via the communication interface and of the realization of the pixel mixture correction with the directionality of the adjacent pixels with respect to the target pixel (the pixel to be corrected) by switching between the correction parameters Ki_t, Ki_b, Ki_l, and Ki_r, described in Japanese Unexamined Patent Application Publication No. 2007-142697. Accordingly, there is an advantage in that the appropriate pixel mixture correction can be realized also in the image pickup device adopting the pixel sharing technology.

Second Embodiment

According to the first embodiment described above, the top, bottom, left, and right correction parameters Ki_t, Ki_b, Ki_l, and Ki_r are used to realize the pixel mixture correction with the directionality of the adjacent pixels with respect to the target pixel (the pixel to be corrected). In the example illustrated in FIG. 12, the pixel mixture correction arithmetic processor 4266 concurrently performs the calculations for the top, bottom, left, and right pixels in parallel for every pixel clock. Accordingly, it is necessary to basically provide the four multiplier circuits for every channel (for example, also assuming a case where multiple pixels are concurrently processed in parallel through multiple channels). In addition, it is necessary to provide the four selectors in the sharing-pixel correction-parameter selector 424.

Figure 13:
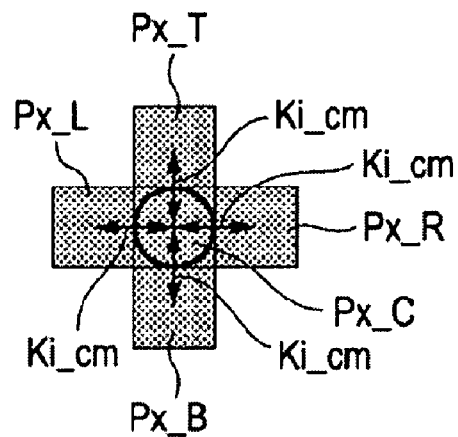
FIG. 13 is a diagram for description of an image pickup apparatus according to a second embodiment of the present invention.

FIG. 13 shows a case where little directionality is found in the pixel mixture characteristics between the target pixel Px_C and the top, bottom, left, and right adjacent pixels Px_T, Px_B, Px_L, and Px_R and, therefore, the correction parameter Ki_t=Ki_b=Ki_l=Ki_r=Ki_cm, where Ki_cm denotes a common correction parameter with no directionality.

In such a case, since the one common correction parameter Ki_cm can be used in the pixel mixture correction between the target pixel Px_C and the top, bottom, left, and right adjacent pixels Px_T, Px_B, Px_L, and Px_R, the pixel mixture corrector 426 can be reduced in size. For example, it is sufficient to provide one multiplier circuit.

Figure 14:
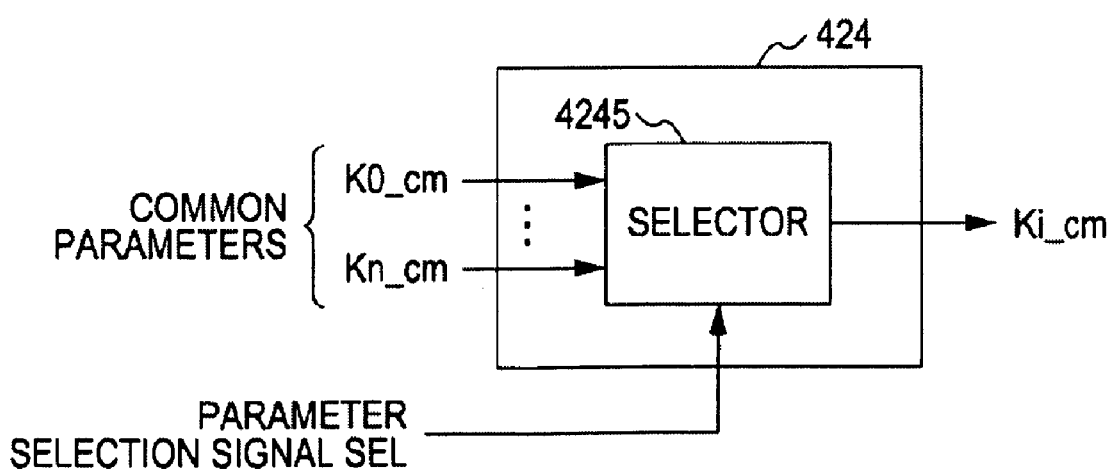
FIG. 14 illustrates an example of the configuration of a processor in the image pickup apparatus according to the second embodiment of the present invention.

A second embodiment of the present invention is applied to the case where the circuit is reduced in size. FIG. 14 illustrates an example of the configuration of the sharing-pixel correction-parameter selector 424 according to the second embodiment.

As shown in FIG. 14, it is sufficient for the camera control microcomputer 5 to generate multiple common parameters K0_cm, K1_cm, . . . , Kn_cm corresponding to the pixel sharing IDs as the correction parameter group in the second embodiment.

The sharing-pixel correction-parameter selector 424 includes one selector 4245. The multiple common parameters K0_cm, K1_cm, . . . , Kn_cm are supplied from the camera control microcomputer 5 to the selector 4245 through the communication interface 425.

The selector 4245 is controlled in response to the parameter selection signal SEL supplied from the timing generator 423 as in the first embodiment to output the common correction parameter Ki_cm appropriate for the correction target pixel corresponding to each sharing pixel ID.

FIG. 15 is a block diagram showing an example of the configuration of the pixel mixture correction arithmetic processor 4266 according to the second embodiment. Referring to FIG. 15, in the pixel mixture correction arithmetic processor 4266 according to the second embodiment, the differences output from the subtractor circuits 501, 502, 503, and 504 are added together in an adder circuit 523 and the addition result is supplied to a common multiplier circuit 515.

According to the second embodiment, the common correction parameter Ki_cm from the sharing-pixel correction-parameter selector 424 is supplied to the common multiplier circuit 515 where the addition result in the adder circuit 523 is multiplied by the common correction parameter Ki_cm. The multiplication result in the common multiplier circuit 515 is supplied to the adder circuit 521 where the multiplication result is added to the correction target pixel signal Sig_c. As a result, the output signal Sig_c', which is the calculation result of Equation (2), is generated in the adder circuit 521 and the output signal Sig_c' is supplied to the selector 522.

$$Sig\_c' = Sig\_c + Ki\_cm \times [(Sig\_c - Sig\_t) + K\_r(Sig\_c - Sig\_r) + \\ K\_l(Sig\_c - Sig\_l) + K\_b(Sig\_c - Sig\_b)] \quad (2)$$

The remaining components are configured in the same manner as in the first embodiment.

According to the second embodiment, the pixel mixture correction is realized with one multiplier circuit in the pixel mixture correction arithmetic processor 4266 while the flexibility involved in the directionality of the adjacent pixels with respect to the target pixel (pixel to be corrected) is lost. Accordingly, the circuit configuration according to the second embodiment is very effective, for example, when the directionality of the color mixture in the image sensor can be ignored to achieve the desired image quality.

As described above, according to the above embodiments, it is possible to correct the "unevenness of the pixel mixture characteristics" due to the unevenness of the circuit layout between the adjacent pixels caused by the common pattern of the solid-state image pickup device by applying the very simple configuration to the solid-state image pickup device (regardless of the sharing pattern, the filter coding, and the readout channel mode) sharing the circuit, such as the transistor, necessary for the pixel structure between pixels adjacent or close to the target pixel in order to improve the pixel sensitivity.

Other Embodiments and Modifications

Although the pixel mixture correction is realized by hardware in the above embodiments, the pixel mixture correction may be realized by software in a microcomputer. For example, FIG. 16 is a flowchart showing an example of a software process.

Referring to FIG. 16, in Step S101, the microcomputer acquires pixel data about a correction target pixel and the top, bottom, left, and right adjacent pixels with respect to the correction target pixel.

In Step S102, the microcomputer refers to the sharing pixel ID of the correction target pixel to select and acquire the correction parameter group or the common correction parameter corresponding to the sharing pixel ID from the set of the correction parameter groups that are generated in advance.

In Step S103, the microcomputer performs the pixel mixture correction arithmetic processing by using the pixel data about the correction target pixel and the top, bottom, left, and right adjacent pixels acquired in Step S101 and the correction parameter group or the common correction parameter selected and acquired in Step S102. Then, the software process is terminated.

Although the color filters arranged in the solid-state image pickup device, the readout channel, and the method of sharing pixels are described with reference to the examples in the above embodiments, the present invention is not restricted to the described examples. Various examples can be applied to the present invention insofar as they are within the scope of the present invention.

For example, in the examples shown in FIGS. 4A to 4C, the colors of the color filters are not considered in the pixel output sequences represented by the sharing pixel IDs. However, when the colors of the color filters arranged in the solid-state image pickup device are considered, the sharing pixel IDs and the pixel output sequences represented by the sharing pixel IDs in the three examples of the arrangement patterns of the sharing pixels shown in FIGS. 4A to 4C are changed to the ones shown in FIGS. 17A to 17C.

Specifically, the three examples of the arrangement patterns of the sharing pixels in the upper lines in FIGS. 17A, 17B, and 17C have sharing pixel IDs shown in the medium lines. The pixel output sequences represented by the sharing pixel IDs shown in the lower lines are output from the three examples of the arrangement patterns.

In this case, the correction parameter group or the common correction parameter corresponding to the sharing pixel IDs shown in the medium lines in FIGS. 17A to 17C is selected and the correction is performed in synchronization with the pixel output sequence shown in the lower lines in FIGS. 17A to 17C.

Although the multipliers are used in the multiplication of the correction parameter in the pixel mixture correction arithmetic processor 4266 according to the first and second embodiments, the multiplication may be realized by a bitshift structure. Either of the use of the multipliers and the realization of the multiplication in the bitshift configuration is selected on the basis of the balance between the accuracy of the correction and the circuit size.

Although the same correction parameter group is used across the entire screen of the image sensor to perform the pixel mixture correction for every sharing pixel in the above embodiments, there are cases where the characteristics for every sharing pixel are not constant across the entire screen. For example, the characteristics in the central area of the screen can be different from those in the peripheral area of the screen.

In such a case, the correction parameter group for the central area of the screen and the correction parameter group for the peripheral area thereof are provided and, for example, are stored in a memory. The correction parameter groups are switched on the basis of the result of detection of whether the correction target pixel is positioned in the central area of the screen or the peripheral area thereof.

Although the camera control microcomputer 5 generates the correction parameter group in advance to store the correction parameter group in its own memory and supplies the correction parameter group to the sharing-pixel correction-parameter selector 424 in the above description, the camera control microcomputer 5 may supply the correction parameter group to the sharing-pixel correction-parameter selector 424 while generating the correction parameter group, instead of the storage of the correction parameter group.

Although the sharing pixel pattern and the readout method shown in FIG. 4A is exemplified in the description of the configurations in the first to third embodiments, it is desirable that, for example, the timing generator 423 be made programmable so that another sharing pixel pattern and readout method can be supported.

Although the solid-state image pickup device is exemplified by the CMOS image sensor in the above embodiments, the solid-state image pickup device may be a CCD image sensor.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
  a solid-state image pickup device configured to share a circuit necessary for a pixel structure between multiple pixels composing each set, the multiple pixels being arranged in a two-dimensional array, the set including a certain number of pixels having the same arrangement pattern;
  pixel mixture correcting means for correcting leakage of light that should be incident on each pixel of the solid-state image pickup device from the pixel into adjacent pixels around the pixel and/or leakage of light that should be incident on the adjacent pixels into the pixel in accordance with a correction parameter;
  correction parameter generating means for generating multiple correction parameters corresponding to the multiple pixels composing the set; and
  correction parameter selecting means for selecting the correction parameter from the multiple correction parameters supplied from the correction parameter generating means in accordance with which pixel in the multiple pixels composing the set a pixel to be corrected by the pixel mixture correcting means corresponds to and supplying the selected correction parameter to the pixel mixture correcting means.

2. The image pickup apparatus according to claim 1, wherein the pixel mixture correcting means corrects the pixel to be corrected by using the values of the multiple adjacent pixels around the pixel to be corrected and the correction parameters generated for the multiple adjacent pixels.

3. The image pickup apparatus according to claim 1, wherein the pixel mixture correcting means corrects the pixel to be corrected by using the values of the multiple adjacent pixels around the pixel to be corrected and the correction parameter common to the multiple adjacent pixels.

4. A method of correcting captured image data in an image pickup apparatus provided with a solid-state image pickup device configured to share a circuit necessary for a pixel structure between multiple pixels composing each set, the multiple pixels being arranged in a two-dimensional array, the set including a certain number of pixels having the same arrangement pattern, the method comprising:
  selecting the correction parameter from the multiple correction parameters corresponding to the multiple pixels composing the set in accordance with which pixel in the multiple pixels composing the set a pixel to be corrected corresponds to, the correction parameter being used for correcting leakage of light that should be incident on each pixel of the solid-state image pickup device from the pixel into adjacent pixels around the pixel and/or leakage of light that should be incident on the adjacent pixels into the pixel; and
  receiving the correction parameter that is selected and correcting the pixel to be corrected in accordance with the correction parameter.

5. A non-transitory computer-readable medium for storing a computer-readable program for an image pickup apparatus provided with a solid-state image pickup device configured to share a circuit necessary for a pixel structure between multiple pixels composing each set, the multiple pixels being arranged in a two-dimensional array, the set including a certain number of pixels having the same arrangement pattern, the program comprising:
  computer-executable instructions for selecting the correction parameter from the multiple correction parameters corresponding to the multiple pixels composing the set in accordance with which pixel in the multiple pixels composing the set a pixel to be corrected corresponds to, the correction parameter being used for correcting leakage of light that should be incident on each pixel of the solid-state image pickup device from the pixel into adjacent pixels around the pixel and/or leakage of light that should be incident on the adjacent pixels into the pixel; and
  computer-executable instructions for receiving the correction parameter that is selected and correcting the pixel to be corrected in accordance with the correction parameter.

6. An image pickup apparatus comprising:
  a solid-state image pickup device configured to share a circuit necessary for a pixel structure between multiple pixels composing each set, the multiple pixels being arranged in a two-dimensional array, the set including a certain number of pixels having the same arrangement pattern;
  a pixel mixture correcting unit configured to correct leakage of light that should be incident on each pixel of the solid-state image pickup device from the pixel into adjacent pixels around the pixel and/or leakage of light that should be incident on the adjacent pixels into the pixel in accordance with a correction parameter;
  a correction parameter generating unit configured to generate multiple correction parameters corresponding to the multiple pixels composing the set; and
  a correction parameter selecting unit configured to select the correction parameter from the multiple correction parameters supplied from the correction parameter generating unit in accordance with which pixel in the multiple pixels composing the set a pixel to be corrected by the pixel mixture correcting unit corresponds to and to supply the selected correction parameter to the pixel mixture correcting unit.

* * * * *